United States Patent
Yamanaka et al.

(10) Patent No.: US 9,130,909 B2
(45) Date of Patent: Sep. 8, 2015

(54) DATA MANAGEMENT APPARATUS, POWER USAGE CALCULATION SYSTEM, AND DATA MANAGEMENT METHOD

(71) Applicant: Kabushiki Kaisha Toshiba, Minato-ku (JP)

(72) Inventors: Shinji Yamanaka, Shinagawa-ku (JP); Yuichi Komano, Kawasaki (JP); Satoshi Ito, Setagaya-ku (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/133,825

(22) Filed: Dec. 19, 2013

(65) Prior Publication Data
US 2014/0229734 A1    Aug. 14, 2014

(30) Foreign Application Priority Data
Feb. 12, 2013   (JP) .................................. 2013-024960

(51) Int. Cl.
*H04L 29/06* (2006.01)
*H04L 9/06* (2006.01)

(52) U.S. Cl.
CPC ........... *H04L 63/0428* (2013.01); *H04L 9/0637* (2013.01); *H04L 9/0656* (2013.01); *H04L 63/062* (2013.01); *H04L 2463/121* (2013.01)

(58) Field of Classification Search
USPC ............................................. 713/168, 2, 159
See application file for complete search history.

(56) References Cited

U.S. PATENT DOCUMENTS

| | | | |
|---|---|---|---|
| 7,353,388 B1 * | 4/2008 | Gilman et al. | 713/168 |
| 2012/0105249 A1 * | 5/2012 | Bauerfeld et al. | 340/870.02 |
| 2012/0250864 A1 * | 10/2012 | Nishibayashi et al. | 380/278 |
| 2013/0024679 A1 * | 1/2013 | Isozaki | 713/2 |

FOREIGN PATENT DOCUMENTS

| | | |
|---|---|---|
| JP | 2004-112868 | 4/2004 |
| JP | 2012-58852 | 3/2012 |

OTHER PUBLICATIONS

"Development of a Smart Power Meter for AMI Based on ZigBee Communication"; Luan et al; IEEE 2009; International Conference on Power Electronics and Drive Systems, 2009. p. 661-665, 5 pages.*
U.S. Appl. No. 14/177,572, filed Feb. 11, 2014, Ogura, et al.

* cited by examiner

*Primary Examiner* — Jason Lee
(74) *Attorney, Agent, or Firm* — Oblon, McClelland, Maier & Neustadt, L.L.P.

(57) ABSTRACT

According to an embodiment, a data management apparatus includes a first receiver, a generator, a second receiver, a convertor, and a transmitter. The first receiver is configured to receive first values from at least one power meter, the first values being acquired by encrypting power usage amounts collected by the at least one power meter using the corresponding first secret key. The generator is configured to generate a second value by summing the first values. The second receiver is configured to receive a conversion key from a key management server. The conversion key is generated by using the first secret key and the second secret key. The convertor is configured to convert the second value into a third value by using the conversion key. The transmitter is configured to transmit the third value to an application server.

9 Claims, 9 Drawing Sheets

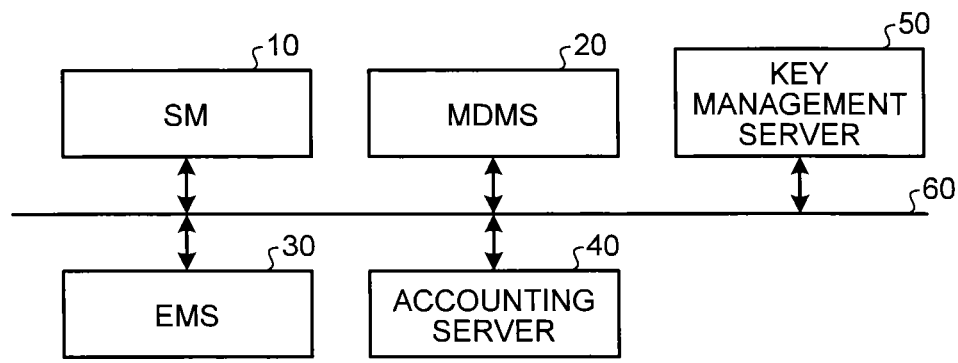
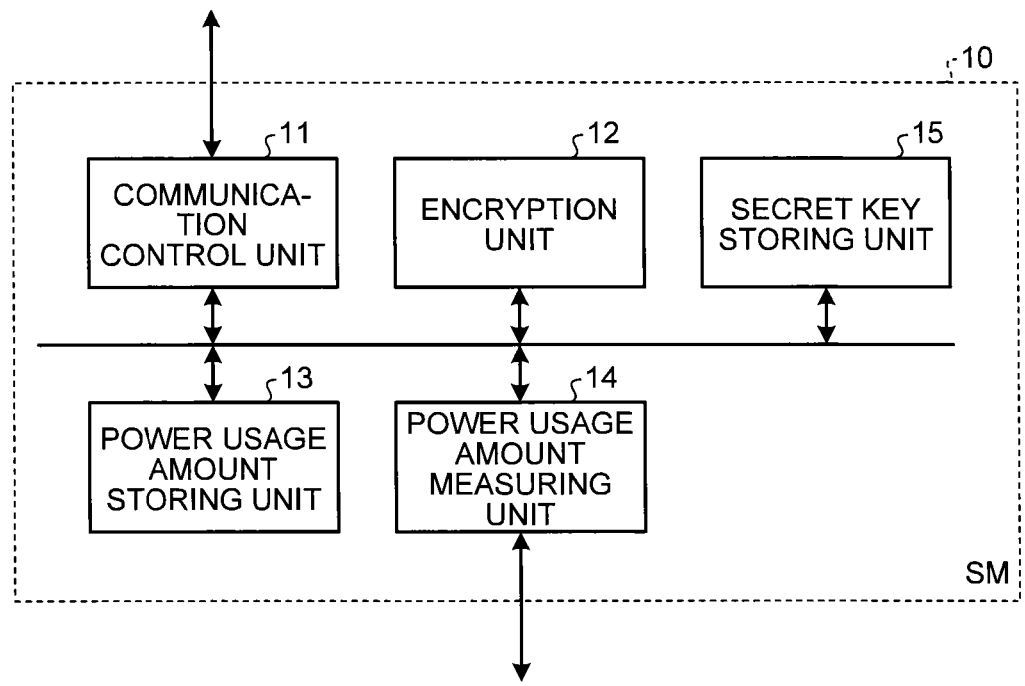

DATA MANAGEMENT APPARATUS, POWER USAGE CALCULATION SYSTEM, AND DATA MANAGEMENT METHOD

CROSS-REFERENCE TO RELATED APPLICATION

This application is based upon and claims the benefit of priority from Japanese Patent Application No. 2013-024960, filed on Feb. 12, 2013; the entire contents of which are incorporated herein by reference.

FIELD

Embodiments described herein relate generally to a data management apparatus, a power usage calculation system, and a data management method.

BACKGROUND

In the next-generation power grid called as a smart grid, a smart meter (hereinafter, referred to as an SM) that collects power usage amounts of electrical devices is installed for each counting range of the power usage amounts such as each house. The SM communicates with a meter data management system (hereinafter, referred to as an MDMS), which is a data management apparatus, through the power grid. The MDMS collects a power usage amount for every unitary time from the SM disposed in each house or the like. The power usage amounts for every unitary time, which are collected by the MDMS, for example, are used by an energy management system (hereinafter, referred to as an EMS) connected to the power grid. The EMS performs power control such as requesting each house and the like within a management target area to suppress the use of power or controlling charging/discharging a storage battery connected to the power grid based on a total amount of the power usage of a plurality of houses and the like collected in the MDMS. In addition, the power usage amounts collected by the MDMS are also used in an accounting server connected to the power grid. The accounting server performs an accounting process for the use of power in each house based on the total amount of the power usage amounts of each house collected by the MDMS for a predetermined period. In this manner, the EMS, the accounting server, and the like (hereinafter, collectively referred to as application servers) use a total amount of the power usage collected by the MDMS from SMs for executing a predetermined application. Accordingly, the MDMS maintains the power usage amount collected from each SM, so that a total amount of power usage, which is used thereafter by application servers, can be calculated.

However, in a case where a configuration is employed in which the power usage amount collected up by each SM is maintained by the MDMS, a supervisor of the MDMS or an unauthorized user penetrating into the MDMS sneaks to look at the power usage amount, and accordingly, the situation of activities and the like in each house can be inferred, which leads to the infringement on privacy. Accordingly, a method for protecting privacy is considered in which a total amount of power usage needed by application servers can be calculated while the power usage amount collected by each SM is maintained in the MDMS in a concealed state. In order to maintain the power usage amounts in the MDMS in the concealed state, it is effective to encrypt the power usage amount in each SM. However, in such a case, it is required not to incur an excessive load in each SM.

BRIEF DESCRIPTION OF THE DRAWINGS

FIG. 1 is a block diagram that illustrates an example of the configuration of a power usage calculation system according to an embodiment;

FIG. 2 is a block diagram that illustrates an example of the functional configuration of an SM;

DETAILED DESCRIPTION

Figure 3:
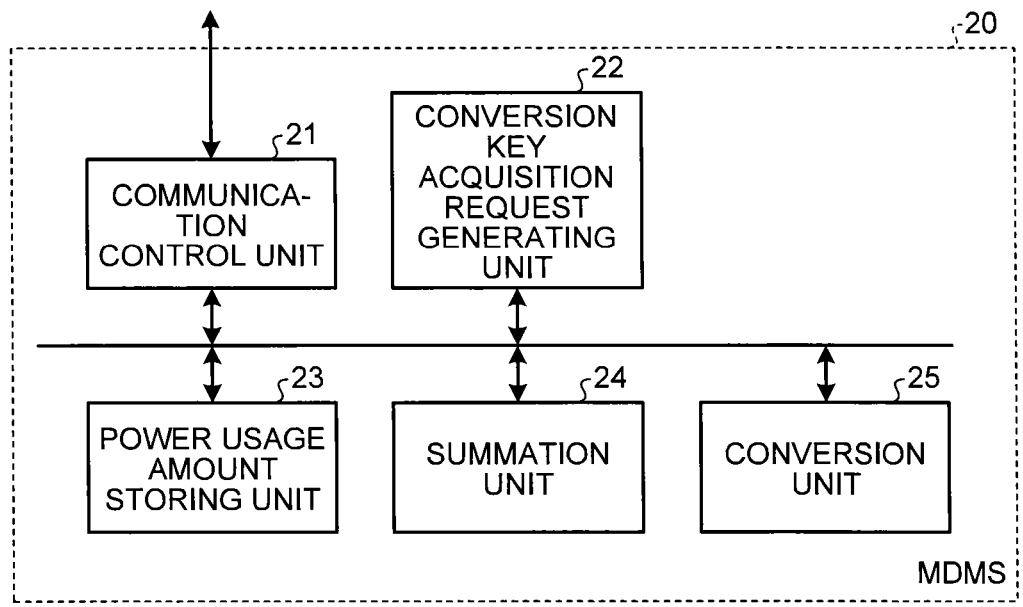
FIG. 3 is a block diagram that illustrates an example of the functional configuration of an MDMS.

According to an embodiment, a data management apparatus is connected to at least one power meter collecting a power usage amount for a unitary time, an application server executing a predetermined application by using a value acquired by summing power usage amounts collected by the at least one power meter, and a key management server maintaining first secret keys maintained by the at least one power meter and a second secret key maintained by the application server. The data management apparatus includes a first receiver, a generator, a second receiver, a converter, and a transmitter. The first receiver is configured to receive a plurality of first values from the at least one power meter. Each of the first values is the power usage amounts encrypted using the corresponding first secret key. The generator is configured to generate a second value by summing the first values. The second receiver is configured to receive a conversion key from the key management server. The conversion key is generated by using the first secret key and the second secret key. The converter is configured to convert the second value into a third value by using the conversion key. The transmitter is configured to transmit the third value to the application server. The third value is a value from which a value acquired by summing the power usage amounts is acquired by decrypting the third value using the second secret key by the application server.

Overview of Power Usage Calculation System

First, an overview of a power usage calculation system according to an embodiment will be described. The power usage calculation system according to the embodiment is equipped with: an SM that is installed to each one of a plurality of counting ranges; an MDMS, an application server; and a key management server.

The SM collects the power usage amount of electrical devices included in the counting range for every unitary time, encrypts the power usage amount that has been collected for every unitary time using a secret key (first secret key) thereof, and transmits an encrypted text (first value) to the MDMS. The secret key that is used for encrypting the power usage amount by the SM is shared by the key management server.

The MDMS receives encrypted texts transmitted from a plurality of the SMs and stores the encrypted texts. At this time, for the MDMS, the secret key used for encrypting the power usage amount by the SM is concealed from the MDMS. Accordingly, the power usage amount for every unitary time, which has been collected by each SM, is not decrypted by the MDMS, whereby the privacy is protected.

In addition, the MDMS sums a plurality of encrypted texts in accordance with a request from the application server, thereby generating a summed encrypted text (second value). Then, the MDMS requests a conversion key from the key management server, receives the conversion key transmitted from the key management server as a response to this request, and converts the summed encrypted text into a converted summed encrypted text (third value) using the conversion key. Then, the MDMS transmits the converted summed encrypted text to the application server as a response to the request from the application server.

The application server receives the converted summed encrypted text transmitted from the MDMS and decrypts the converted summed encrypted text using a secret key thereof (second secret key), thereby generating a total amount of power usage (fourth value) that is a value acquired by summing a plurality of power usage amounts. Then, the application server executes a predetermined application by using the generated total amount of power usage. The secret key that is used for decrypting the converted summed encrypted text by the application server is shared by the key management server.

The key management server generates a conversion key in response to the request from the MDMS and transmits the generated conversion key to the MDMS as a response to the request from the MDMS. The conversion key is generated by using the secret key that is used for encrypting the power usage amount by each SM and the secret key that is used for decrypting the converted summed encrypted text by the application server. The conversion key, as described above, is key information used for converting a summed encrypted text acquired by summing a plurality of encrypted texts, which are acquired by encrypting power usage amounts using the secret key of the SM, into a converted summed encrypted text that can be decrypted into a total amount of power usage that is a value acquired by summing a plurality of power usage amounts using the secret key of the application server.

As above, according to the power usage calculation system of this embodiment, the MDMS does not store the power usage amount but stores an encrypted text that is acquired by encrypting the power usage amount using the secret key of the SM. In addition, the calculation performed by the MDMS in response to a request from the application server is performed with the original power usage amount being concealed. Accordingly, even when the supervisor of the MDMS or an unauthorized user penetrating into the MDMS takes out information from the MDMS, the power usage amount is not leaked, whereby the privacy is protected. Furthermore, the encrypted text that is acquired by encrypting the power usage amount using the secret key of the SM is transmitted from the SM to the MDMS, and the converted summed encrypted text that can be used for decrypting the total amount of power usage using the secret key of the application server is transmitted from the MDMS to the application server. Accordingly, even when the communication between the SM and the MDMS or the communication between the MDMS and the application server becomes an attacking target, the power usage amount or the total amount of power usage is not leaked, whereby the privacy is protected.

In addition, according to the power usage calculation system of this embodiment, the secret key used for encrypting the power usage amount in the SM and the secret key used for decrypting the converted summed encrypted text in the application server are managed by the key management server. Then, by using the conversion key generated by the management server using the secret key, the MDMS converts the summed encrypted text into the converted summed encrypted text and transmits the converted summed encrypted text to the application server, and the application server acquires a total amount of power usage. Accordingly, a system can be realized which is capable of acquiring a total amount of the power usage amounts using the application server without incurring an excessive load for the SM while the power usage amounts are concealed.

As a method for calculating a total amount of power usage amounts to be used by the application server later while the power usage amount collected by each SM is maintained in the MDMS in the concealed state, a method may be considered in which the power usage amount is encrypted using a secret key shared by the SM and the application server, and an encrypted text thereof is maintained in the MDMS. However, according to such a method, it is necessary for the SM to encrypt the power usage amount using a secret key different for each application, and accordingly, the load of the SM is high. In contrast to this, according to the power usage calculation system of this embodiment, the power usage amount may be encrypted using one secret key shared by the SM and the key management server regardless of the kind of the application, and accordingly, the load of the SM is low.

Hereinafter, a power usage calculation system equipped with an EMS and an accounting server as the application server will be described in detail.

The EMS performs power control of a management target area based on a total amount (hereinafter, referred to as a first power usage total amount) of a plurality of power usage amounts for a first unitary time (per a first unit time) collected from a plurality of SMs inside the management target area. Here, the first unitary time is a time interval of the execution of power control performed by the EMS and is, for example, a time interval of 30 minutes. The power usage amount collected by the SM is assumed to be a power usage amount for every first unitary time.

The accounting server performs an accounting process for the use of power in each house or the like based on a total amount (hereinafter, referred to as a second power usage total amount) of power usage amounts of each house or the like, which are collected by the MDMS, for a second unitary time (per a second unit time). Here, the second unitary time is a time unit of the accounting process performed by the accounting server and, normally, is one month. The second unitary time is an integer multiple of the first unitary time, and a value acquired by summing a plurality of power usage amounts collected by one SM for every first unitary time is the second power usage total amount.

Hereinafter, although the SM will be described to collect the power usage amount of a house, even in a case where the SM collects a power usage amount of a building such as an office building, a power usage amount of a factory, or a power usage amount of a region, the same power usage calculation system can be built. In addition, the application server is not limited to the MDMS or the accounting server, but another application server executing a predetermined application using a total amount of the power usage amounts may be included. In addition, an encryption process for the power usage amount, which will be described later, may be performed by a device other than the SM, for example, a concentrator that is an aggregator of the SM or an HES (head end system) that temporarily stores the power usage amount.

First Embodiment

FIG. 1 is a block diagram that illustrates an example of the configuration of a power usage calculation system according to a first embodiment. The power usage calculation system according to this embodiment, as illustrated in FIG. 1, is equipped with an SM 10, an MDMS 20, an EMS 30, an accounting server 40, and a key management server 50 and is configured such that these units are interconnected through a network 60. For simplification of the drawing, only one SM 10 is illustrated, a plurality of the SMs 10 are connected in the power usage calculation system. The network 60, for example, is a LAN (Local Area Network), an intranet, Ethernet (registered trademark), or the Internet.

The SM 10 is a facility that is installed to each house and collects power usage amounts of electrical devices used in the house. To each SM 10, identification information (hereinafter, referred to as SM_ID) used for identifying the SM is assigned, and each SM 10 is assumed to store the SM_ID assigned to the SM 10.

The MDMS 20 is a system that collects a power usage amount of each house from the SM 10 through the network 60 and manages the power usage amount. The MDMS 20 may be configured by a plurality of devices or a single device. Hereinafter, the MDMS 20 is assumed to be configured by a single device in the description.

The EMS 30 acquires a total amount (first power usage total amount) of power usage amounts of a plurality of houses in a management target area for a first unitary time and performs power control such as requesting suppression of the use of power from each house included in the management target area or controlling charging/discharging a storage battery connected to a power grid in consideration of the balance between the first power usage total amount and the amount of power that can be supplied. The EMS 30 may be configured by a plurality of devices or a single device. Hereinafter, the EMS 30 is assumed to be configured by a single device in the description.

The accounting server 40 acquires a total amount (second power usage total amount) of power usage amounts of each house for a second unitary time and performs an accounting process for the use of power for each house.

The key management server 50 shares secret keys with the SM 10, the EMS 30, and the accounting server 40, generates a conversion key, which will be described later, using such secret keys in response to a request from the MDMS 20, and delivers the generated conversion key to the MDMS 20.

Here, it is assumed that the MDMS 20, the EMS 30, the accounting server 40, and the key management server 50 store all the SM_IDs of the SMs 10 connected to the power usage calculation system. The power usage amount for the first unitary time, which is collected by the SM 10, is associated at least with an SM_ID and time information representing a collection time slot. An encrypted text of the power usage amount is generated using the time information associated with the power usage amount as well. However, in addition to the SM_ID and the time information, other information may be further associated with the power usage amount, and an encrypted text may be generated by additionally using the other information.

The SM 10, the EMS 30, and the accounting server 40 have independent secret keys used for encrypting and decrypting the power usage amount, and the same keys as those keys are maintained also by the key management server 50. The secret key of the SM 10 may be embedded in the SM 10 at the time of factory shipment, may be generated inside the SM 10 at the time of the installation thereof to a house and transmitted to the key management server 50 through the network 60, or may be delivered from the key management server 50 through the network 60 after the installation to a house. In addition, the secret keys of the EMS 30 and the accounting server 40 may be delivered from the key management server 50 before the start-up of the applications or may be delivered by the other units. Only members such as the SM 10, the EMS 30, and the accounting server 40 and the key management server 50 may share the same secret keys, and a method of sharing thereof is not particularly limited.

In the power usage calculation system having such a configuration, the SM 10 encrypts a power usage amount for the first unitary time by using the secret key thereof, thereby generating an encrypted text. The encrypted text generated by the SM 10 is transmitted to the MDMS 20 through the network 60.

The MDMS 20 receives the encrypted text transmitted from the SM 10 and maintains the received encrypted text. Then, the MDMS 20 generates a summed encrypted text (hereinafter, referred to as a first summed encrypted text) that is acquired by summing a plurality of encrypted texts collected from the SMs 10 of houses included in the management target area of the EMS 30 in response to a request from the EMS 30. Next, the MDMS 20 transmits an acquisition request for a conversion key (hereinafter, referred to as a first conversion key) used for converting the first summed encrypted text into a converted summed encrypted text (hereinafter, referred to as a first converted summed encrypted text) that can be decrypted into the first power usage total amount by the EMS 30 to the key management server 50 through the network 60. Then, the MDMS 20 receives the first conversion key transmitted from the key management server 50 through the network 60 as a response to the acquisition request and converts the first summed encrypted text into a first converted summed encrypted text by using this first conversion key. Then, the MDMS 20 transmits the acquired first converted summed encrypted text to the EMS 30 through the network 60.

In addition, the MDMS 20, first, generates a summed encrypted text (hereinafter, referred to as a second summed encrypted text) acquired by summing a plurality of encrypted texts included in the second unitary time that are collected from the SMs 10 of designated houses in response to a request from the accounting server 40. Next, the MDMS 20 transmits an acquisition request for a conversion key (hereinafter, referred to as a second conversion key) used for converting the second summed encrypted text into a converted summed encrypted text (hereinafter, referred to as a second converted summed encrypted text) which can be decrypted into a second power usage total amount in the accounting server 40 to the key management server 50 through the network 60. Then, the MDMS 20 receives the second conversion key transmitted from the key management server 50 through the network 60 as a response to the acquisition request and converts the second summed encrypted text into a second converted summed encrypted text by using this second conversion key. Then, the MDMS 20 transmits the acquired second converted summed encrypted text to the accounting server 40 through the network 60.

The EMS 30, as a response to the request, receives the first converted summed encrypted text transmitted from the MDMS 20 through the network 60 and decrypts this first converted summed encrypted text using the secret key thereof, thereby generating a first power usage total amount. Then, the EMS 30 performs power control for the management target area based on the acquired first power usage total amount.

In addition, the accounting server 40, as a response to the request, receives the second converted summed encrypted text transmitted from the MDMS 20 through the network 60 and decrypts this second converted summed encrypted text using the secret key thereof, thereby generating a second power usage total amount. Then, the accounting server 40 performs an accounting process for the use of power in a target house based on the acquired second power usage total amount.

Next, the hardware configurations of the SM 10, the MDMS 20, the EMS 30, the accounting server 40, and the key management server 50 will be described.

The MDMS 20, the EMS 30, the accounting server 40, and the key management server 50 are equipped with: a control unit such as a CPU (Central Processing Unit) that performs control of the whole device or a basic calculation; a main memory unit such as a RAM (Random Access Memory) that serves as a work area of the CPU; an auxiliary storage unit such as a ROM (Read Only Memory), a HDD (Hard Disk Drive), or a CD (Compact Disk) drive device that stores various kinds of data and programs; and a bus that connects those units and has a hardware configuration using a general computer. In addition, the MDMS 20, the EMS 30, the accounting server 40, and the key management server 50 further include a communication I/F (Interface) used for communication through the network 60.

The SM 10 is equipped with: a control unit such as a CPU that controls the whole device; a main memory unit such as a RAM that serves as a work area of the CPU; an auxiliary storage unit such as a ROM or a non-volatile memory that stores various kinds of data and various programs; and a bus that connects those units to each other and has a configuration similar to dedicated hardware or an embedded device. The SM 10 is further equipped with a communication I/F used for performing communication through the network 60. In addition, a display unit displaying various kinds of information such as a power usage amount and an operation input unit such as operation buttons or a keyboard to which a user's operation is input are connected to the SM 10.

Next, in such a hardware configuration, various functions implemented in each of the SM 10, the MDMS 20, the EMS 30, the accounting server 40, and the key management server 50 will be described.

First, various functions implemented in the SM 10 will be described. FIG. 2 is a block diagram that illustrates an example of the functional configuration of the SM 10. The SM 10, for example, as illustrated in FIG. 2, is equipped with: a communication control unit 11; an encryption unit 12; a power usage amount storing unit 13; a power usage amount measuring unit 14; and a secret key storing unit 15. The function of the communication control unit 11 is implemented by the communication I/F and various programs executed by the CPU. The functions of the encryption unit 12 and the power usage amount measuring unit 14 are implemented by various programs executed by the CPU. The power usage amount storing unit 13 and the secret key storing unit 15, for example, are storage areas secured in the auxiliary storage unit.

The communication control unit 11 controls communication with the MDMS 20 that is performed through the network 60. More specifically, the communication control unit 11 receives a control command transmitted from the MDMS 20 or transmits an encrypted text that is acquired by encrypting the power usage amount stored in the power usage amount storing unit 13 using the encryption unit 12 to be described later to the MDMS 20 (first transmission unit).

The power usage amount measuring unit 14 collects the power usage amount of electrical devices included in a house for every first unitary time (collection unit). Then, the power usage amount measuring unit 14 stores the collected power usage amount in the power usage amount storing unit 13. In addition, the power usage amount measuring unit 14 starts to collect the power usage amount or stops the collection thereof in accordance with a control command received by communication control unit 11.

The power usage amount storing unit 13 stores the power usage amount of every first unitary time that is collected by the power usage amount measuring unit 14. The power usage amount stored in the power usage amount storing unit 13 is removed after a first predetermined time elapses. Here, the first predetermined time is a time depending on the size of the storage area of the SM 10 and the like and, for example, is an interval of two weeks or 30 days.

The encryption unit 12 encrypts the power usage amount of every first unitary time, which is stored in the power usage amount storing unit 13, by using the secret key stored in the secret key storing unit 15, thereby generating an encrypted text (first generation unit). In this embodiment, for encrypting the power usage amount, a stream cipher system using a secret key shared by the key management server 50 is used. The encryption of the power usage amount will be described later in detail.

The secret key storing unit 15 stores a secret key that is used for generating an encrypted text by encrypting the power usage amount.

Here, the secret keys will be described. As the secret keys, there are a secret key Ksm that is shared only between the SM 10 and the key management server 50, a secret key Ke that is shared only between the EMS 30 and the key management server 50 and a secret key Kp that is shared only between the accounting server 40 and the key management server 50. Among these, the secret key Ksm is stored in the secret key storing unit 15 of the SM 10. In addition, the secret keys Ksm of a plurality of SMs 10 have values different from each other.

The encryption unit 12 does not directly use the secret key Ksm for encrypting the power usage amount but generates a temporary key using the secret key Ksm and the above-described time information and encrypts the power usage amount using the temporary key. Examples of the time information include "Jan. 1, 2012", "14:35:46, 1/1/2012", and UNIX (registered trademark) time (the number of seconds that has elapsed from 0:0:0 (GMT) of Jan. 1, 1970 as a starting point). When the secret key is Ksm, and the time information is t, the temporary key Ksm_t is calculated by using the following Equation (1).

$$\text{Ksm}\_t = h(\text{Ksm}, t) \qquad (1)$$

Here, $h(x, y)$ is a one-way function having x and y as inputs or a hash function with a key. Examples of the one-way function include sha-1, md5, and sha256, and an example of the hash function with a key includes hmac.

Next, a specific example of an encryption method performed by the encryption unit 12 will be described. The encryption method used in this embodiment has homomorphism. The encryption Enc_P(ek_P, d) for encrypting data d with an encryption key ek_P having homomorphism represents that "Enc_P(ek_P, d)*Enc_P(ek_P, d')=Enc_P(ek_P, d+d')" is satisfied for data d and data d'. Here, "+" represents arithmetic addition, and "*" represents an appropriate operator. Examples of such an encryption method include a Caesar cipher using a sufficiently large cardinal number and encryption disclosed in the following Reference Literature 1, and "*" respectively represents addition and modular multiplication in a residue class ring. Reference Literature 1: Pascal Paillier, Public-Key Cryptosystems Based on Composite Degree Residuosity Classes, EUROCRYPT 1999, pp 223-238

Here, a specific example of the sequence of generating an encrypted text by encrypting a power usage amount will be described. The power usage amount collected by the power usage amount measuring unit 14 for the first unitary time represented by time information t is assumed to be dt. The encryption unit 12, first, calculates ct using the following Equation (2).

$$ct = dt + \text{KsmST}\_t \pmod{\alpha} \quad (2)$$

Here, KsmST_t is a key series (KsmST_t=ST(Ksm_t), and ST( ) is a (key derivation function for) stream cipher that is acquired by operating a stream cipher with a temporary key Ksm_t acquired by using the time information t set as an input. The stream cipher ST( ) for example, may be implemented by using RC4 or operating an OFB mode, a CFB mode, or a CTR mode as the use mode of the block cipher. Here, a parameter $\alpha$ is a large prime number and needs to be shared between a member performing encryption, a member converting an encrypted text, and a member performing decryption.

In addition, for simplification of the process, it may be set such that KsmST_t=Ksm_t. In other words, the process may be simplified by calculating ct by directly adding the temporary key Ksm_t acquired by using the secret key Ksm and the time information t to the power usage amount dt. Such simplification may be applied also to the generation of a conversion key to be described later or a decryption process.

Since the time information t is information that is necessary to the subsequent processes, it is necessary to transmit the time information to the MDMS 20 with being accompanied by the encrypted text. Accordingly, data Csm_t transmitted by the SM 10 to the MDMS 20, as represented in the following Equation (3), is data in which the encrypted text ct and the time information t are associated with each other.

$$\text{Csm}\_t = (ct, t) \quad (3)$$

Hereinafter, the data Csm_t=(ct, t) in which the encrypted text ct and the time information t are associated with each other is assumed to be treated as an encrypted text of the power usage amount.

Next, various functions implemented by the MDMS 20 will be described. FIG. 3 is a block diagram that illustrates an example of the functional configuration of the MDMS 20. The MDMS 20, for example, as illustrated in FIG. 3, is equipped with a communication control unit 21, a conversion key acquisition request generating unit 22, a power usage amount storing unit 23, a summation unit 24, and a conversion unit 25. The functions of the communication control unit 21 are implemented by the communication I/F and various programs executed by the CPU. The functions of the conversion key acquisition request generating unit 22, the summation unit 24, and the conversion unit 25 are implemented by various programs executed by the CPU. The power usage amount storing unit 23, for example, is a storage area that is secured in the auxiliary storage unit.

The communication control unit 21 controls communication with the other devices such as the SM 10, the EMS 30, the accounting server 40, and the key management server 50 that is performed through the network 60. More specifically, the communication control unit 21 receives an encrypted text of a power usage amount from the SM 10 for every first unitary time (first reception unit), transmits an acquisition request for a first conversion key or a second conversion key to the key management server 50, or receives a first conversion key or a second conversion key transmitted from the key management server 50 as a response to this acquisition request (second reception unit). In addition, the communication control unit 21 transmits a control command to the SM 10, receives the acquisition request for a first converted summed encrypted text from the EMS 30, transmits the first converted summed encrypted text generated by the conversion unit 25 to be described later to the EMS 30 as a response to this request (second transmission unit), receives an acquisition request for the second converted summed encrypted text from the accounting server 40, or transmits the second converted summed encrypted text generated by the conversion unit 25 to be described later to the accounting server 40 as a response to this acquisition request (second transmission unit). Here, the control command transmitted to the SM 10, for example, is a command used for an instruction for stopping or starting the measurement of the power usage amount or transmitting the power usage amount.

The power usage amount storing unit 23 stores the encrypted text of the power usage amount for every first unitary time received by the communication control unit 21 from the SM 10.

The summation unit 24, in response to the request from the EMS 30, sums a plurality of encrypted texts of the power usage amounts of the first unitary time that are collected from the SMs 10 of all the houses included in the management target area of the EMS 30 and are stored in the power usage amount storing unit 23, thereby generating a first summed encrypted text (second generation unit). In addition, the summation unit 24, in response to the request from the accounting server 40, sums a plurality of encrypted texts of the power usage amounts corresponding to the second unitary time that are collected from the SMs 10 of houses designated as accounting targets and are stored in the power usage amount storing unit 23, thereby generating a second summed encrypted text (second generation unit).

The conversion key acquisition request generating unit 22 generates an acquisition request for a first conversion key used for converting the first summed encrypted text generated by the summation unit 24 into a first converted summed encrypted text or an acquisition request for a second conversion key used for converting the second summed encrypted text generated by the summation unit 24 into a second converted summed encrypted text. In the acquisition request Req1 for the first conversion key, the identification information of the EMS 30, the SM_IDs of SMs 10 of houses (all the houses included in the management target area) designated by the EMS 30, and time information t designated by the EMS 30 are included. On the other hand, in the acquisition request Req2 for the second conversion key, the identification information of the accounting server 40, the SM_IDs of SMs 10 of houses (the houses targeted for accounting) designated by the accounting server 40, and the time information t1, t2, . . . , tn of all the first unitary times within the second unitary time (for example, one month) designated by the accounting server 40 are included.

The acquisition request Req1 of the first conversion key that is generated by the conversion key acquisition request generating unit 22 is transmitted from the communication control unit 21 to the key management server 50 through the network 60. Then, as a response to the acquisition request Req1 of the first conversion key, the first conversion key transmitted from the key management server 50 through the network 60 is received by the communication control unit 21. In addition, the acquisition request Req2 of the second conversion key that is generated by the conversion key acquisition request generating unit 22 is transmitted from the communication control unit 21 to the key management server 50 through the network 60. Then, as a response to the acquisition request Req2 of the second conversion key, the second conversion key transmitted from the key management server 50 through the network 60 is received by the communication control unit 21.

The conversion unit 25 converts the first summed encrypted text generated by the summation unit 24 into a first converted summed encrypted text by using the first conversion key transmitted from the key management server 50. In addition, the conversion unit 25 converts the second summed encrypted text generated by the summation unit 24 into a second converted summed encrypted text by using the second conversion key transmitted from the key management server 50. The first converted summed encrypted text generated by the conversion unit 25 is transmitted from the communication control unit 21 to the EMS 30 through the network 60 as a response to the acquisition request for the first converted summed encrypted text from the EMS 30. In addition, the second converted summed encrypted text generated by the conversion unit 25 is transmitted from the communication control unit 21 to the accounting server 40 through the network 60 as a response to the acquisition request for the second converted summed encrypted text from the accounting server 40.

Here, a specific example of the sequence of generating a summed encrypted text by summing a plurality of encrypted texts and the sequence of converting the summed encrypted text into a converted summed encrypted text using the conversion key will be described. First, an example of the sequence of generating a first summed encrypted text using the summation unit 24 will be described. Here, the number of SMs 10 that are targets for the summation will be described as three. The three SMs 10 will be represented by SMs 10a, 10b, and 10c. When the encrypted texts of power usage amounts of the SMs 10a, 10b, and 10c for the first unitary time represented by time information t are denoted by Csm_a_t, Csm_b_t, and Csm_c_t, the encrypted texts can be represented as in the following Equations (4) to (6).

$$Csm\_a\_t = (ct\_a, t) \quad (4)$$

$$Csm\_b\_t = (ct\_b, t) \quad (5)$$

$$Csm\_c\_t = (ct\_c, t) \quad (6)$$

At this time, when the first summed encrypted text is denoted by $Csm\_1A(abc)\_(t)$, the summation unit 24 can acquire a first summed encrypted text using the following Equation (7).

$$Csm\_1A(abc)\_(t) = (C1A\_c, t) \quad (7)$$

Here, $C1A\_c = ct\_a + ct\_b + ct\_c \pmod{\alpha}$.

Next, an example of the sequence of generating a second summed encrypted text using the summation unit 24 will be described. Here, the SM 10 of a house that is a target for accounting will be denoted by an SM 10a, and the time information of all the first unitary times within the second unitary time will be denoted by t1, t2, ..., tn. When the encrypted texts of power usage amounts at the first unitary time represented by t1, t2, ..., tn are denoted by Csm_a_t1, Csm_a_t2, ..., Csm_a_tn, the encrypted texts can be represented as in the following Equations (8) to (10).

$$Csm\_a\_t1 = (ct\_t1\_a, t1) \quad (8)$$

$$Csm\_a\_t2 = (ct\_t2\_a, t2) \quad (9)$$

...

$$Csm\_a\_tn = (ct\_tn\_a, tn) \quad (10)$$

At this time, when the second summed encrypted text is denoted by $Csm\_2A(a)\_(t1, t2, \ldots, tn)$, the summation unit 24 can acquire a second summed encrypted text using the following Equation (11).

$$Csm\_2A(a)\_(t1, t2, \ldots, tn) = (C2A\_c, t1, t2, \ldots, tn) \quad (11)$$

Here, $C2A\_c = ct\_t1\_a + ct\_t2\_a + \ldots + ct\_tn\_a \pmod{\alpha}$.

Next, an example of the sequence of converting the first summed encrypted text into a first converted summed encrypted text using the conversion unit 25 will be described. Here, the first conversion key received from the key management server 50 will be denoted by K(a, b, c, t). A specific example of the method of generating the first conversion key will be described later. At this time, when the first converted summed encrypted text is denoted by $Csm\_1B(abc)\_(t)$, the conversion unit 25 can acquire the first converted summed encrypted text using the following Equation (12).

$$Csm\_1B(abc)\_(t) = (C1B\_c, t) \quad (12)$$

Here, $C1B\_c = C1A\_c - K(a,b,c,t) \pmod{\alpha}$.

Finally, an example of the sequence of converting the second summed encrypted text into a second converted summed encrypted text will be described. Here, the second conversion key received from the key management server 50 will be denoted by K(a, t1, t2, ..., tn). A specific example of the method of generating the second conversion key will be described later. At this time, when the second converted summed encrypted text is denoted by $Csm\_2B(a)\_(t1, t2, \ldots, tn)$, the conversion unit 25 can acquire the second converted summed encrypted text using the following Equation (13).

$$Csm\_2B(a)\_(t1, t2, \ldots, tn) = (C2B\_c, t1, t2, \ldots, tn) \quad (13)$$

Here, $C2B\_c = C2A\_c - K(a, t1, t2, \ldots, tn) \pmod{\alpha}$.

Figure 4:
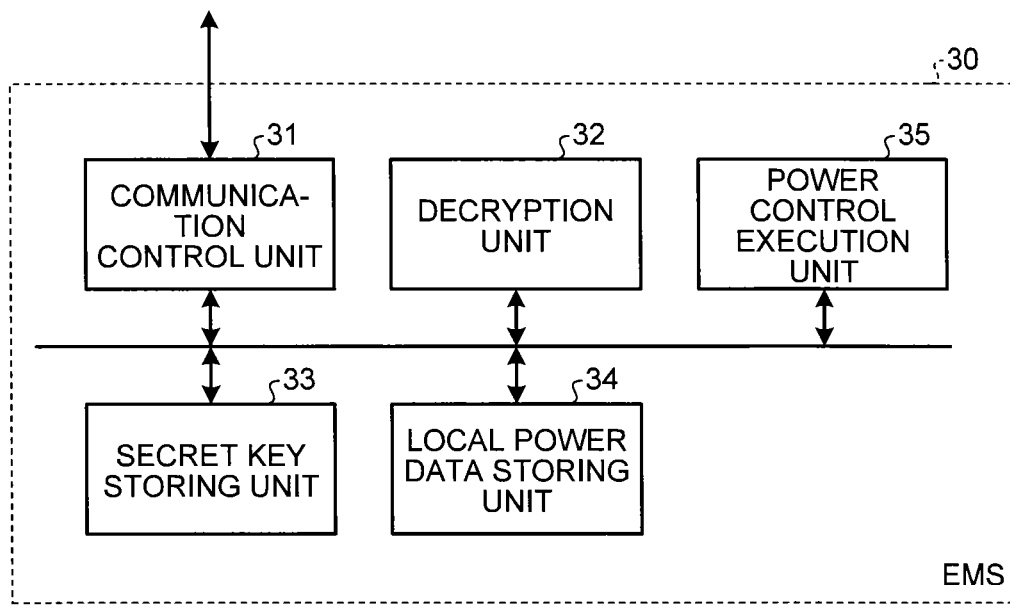
FIG. 4 is a block diagram that illustrates an example of the functional configuration of an EMS.

Next, various functions implemented in the EMS 30 will be described. FIG. 4 is a block diagram that illustrates an example of the functional configuration of the EMS 30. The EMS 30, for example, as illustrated in FIG. 4, is equipped with: a communication control unit 31; a decryption unit 32; a secret key storing unit 33; a local power data storing unit 34; and a power control execution unit 35. The function of the communication control unit 31 is implemented by the communication I/F and various programs executed by the CPU. The functions of the decryption unit 32 and the power control execution unit 35 are implemented by various programs executed by the CPU. The secret key storing unit 33 and the local power data storing unit 34, for example, are storage areas secured in the auxiliary storage unit.

The communication control unit 31 controls communication with the MDMS 20 that is performed through the network 60. More specifically, the communication control unit 31 transmits an acquisition request for the first converted summed encrypted text from the MDMS 20 or receives the first converted summed encrypted text transmitted from the MDMS 20 as a response to this acquisition request (third reception unit). In the acquisition request for the first converted summed encrypted text that is transmitted from the communication control unit 31 to the MDMS 20, SM_IDs of SMs 10 of all the houses included in the management target area and time information t that is a target for requesting the first power usage total amount are included.

The secret key storing unit 33 stores the above-described secret key Ke that is shared with the key management server 50.

The local power data storing unit 34 stores the first converted summed encrypted text received by the communication control unit 31 and the first power usage total amount that is acquired by decrypting the first converted summed encrypted text using the secret key Ke that is performed by the decryption unit 32 to be described later.

The decryption unit 32 decrypts the first converted summed encrypted text received by the communication control unit 31 by using the secret key Ke stored in the secret key storing unit 33, thereby generating a first power usage total amount (third generation unit).

Here, a specific example of the sequence of generating a first power usage total amount by decrypting the first converted summed encrypted text using the secret key Ke that is performed by the decryption unit 32 will be described. Here, a case will be described as an example in which the communication control unit 31 receives a first converted summed encrypted text $Csm\_1B(abc)\_(t)=(C1B\_c, t)$ from the MDMS 20.

The decryption unit 32, first, performs a calculation represented by the following Equation (14) by using the time information t included in the first converted summed encrypted text received from the MDMS 20 and the secret key Ke thereof.

$$Ke\_t = h(Ke, t) \quad (14)$$

Here, as described above, h(x, y) is a one-way function having x and y as inputs or a hash function with a key.

However, in a case where a stream cipher is used at the time of encryption, instead of the calculation represented in Equation (14), the calculation represented in the following Equation (15) is performed.

$$Ke\_t = ST(h(Ke, t)) \quad (15)$$

Next, the decryption unit 32 performs the calculation represented in the following Equation (16) using Ke_t acquired in Equation (14) or (15), thereby acquiring a first power usage total amount d_EMS.

$$d\_EMS = C1B\_c - Ke\_t \pmod{\alpha} \quad (16)$$

The power control execution unit 35 performs power control for the management target area based on the first power usage total amount generated by the decryption unit 32 (execution unit). The power control, for example, is a control process in which each house within the management target area is requested to suppress the use of power or a storage battery connected to the power grid is urged to be discharged in a case where the first power usage total amount exceeds an upper limit and surplus supply power is charged in each storage battery connected to the power grid in a case where the first power usage total amount is below a lower limit.

Figure 5:
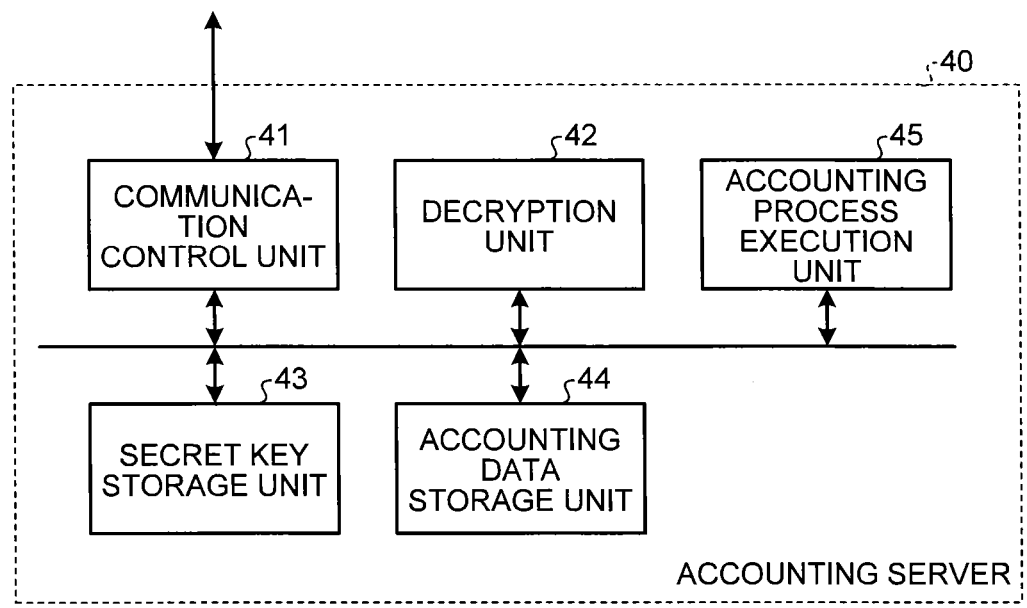
FIG. 5 is a block diagram that illustrates an example of the functional configuration of an accounting server.

Next, various functions implemented in the accounting server 40 will be described. FIG. 5 is a block diagram that illustrates an example of the functional configuration of the accounting server 40. The accounting server 40, for example, as illustrated in FIG. 5, is equipped with: a communication control unit 41; a decryption unit 42; a secret key storing unit 43; an accounting data storage unit 44; and an accounting process execution unit 45. The function of the communication control unit 41 is implemented by the communication I/F and various programs executed by the CPU. The functions of the decryption unit 42 and the accounting process execution unit 45 are implemented by various programs executed by the CPU. The secret key storing unit 43 and the accounting data storage unit 44, for example, are storage areas secured in the auxiliary storage unit.

The communication control unit 41 controls communication with the MDMS 20 that is performed through the network 60. More specifically, the communication control unit 41 transmits an acquisition request for the second converted summed encrypted text to the MDMS 20 or receives a second converted summed encrypted text transmitted from the MDMS 20 as a response to this acquisition request (third reception unit). In the acquisition request for the second converted summed encrypted text that is transmitted from the communication control unit 41 to the MDMS 20, the SM_ID of the SM 10 of a house that is a target for accounting and the time information t1, t2, . . . , tn of all the first unitary times within the second unitary time that are targets for accounting are included.

The secret key storing unit 43 stores the above-described secret key Kp shared with the key management server 50.

The accounting data storage unit 44 stores the second converted summed encrypted text received by the communication control unit 41 or the second power usage total amount that is acquired by decrypting the second converted summed encrypted text using the secret key Kp that is performed by the decryption unit 42 to be described later.

The decryption unit 42 decrypts the second converted summed encrypted text received by the communication control unit 41 by using the secret key Kp stored in the secret key storing unit 43, thereby generating a second power usage total amount (third generation unit).

Here, a specific example of the sequence of generating the second power usage total amount by decrypting the second converted summed encrypted text using the secret key Kp in the decryption unit 42 will be described. Here, a case will be described as an example in which the communication control unit 41 receives the second converted summed encrypted text $Csm\_2B(a)\_(t1, t2, \ldots, tn) = (C2B\_c, t1, t2, \ldots, tn)$ from the MDMS 20.

The decryption unit 42, first, performs a calculation represented in the following Equation (17) using the time information t1, t2, . . . , tn included in the second converted summed encrypted text received from the MDMS 20 and the secret key Kp thereof.

$$Kp\_(t1, t2, \ldots, tn) = h(Kp, t1, t2, \ldots, tn) \quad (17)$$

Here, h(a, b1, . . . , bn) is a one-way function having a, b1, . . . , bn as inputs or a hash function with a key.

However, in a case where a stream cipher is used at the time of encryption, instead of the calculation represented in Equation (17), the calculation represented in the following Equation (18) is performed.

$$Kp\_(t1, t2, \ldots, tn) = ST(h(i\ Kp, t1, t2, \ldots, tn)) \quad (18)$$

Next, the decryption unit 42 performs a calculation represented in the following Equation (19) using Kp_(t1, t2, . . . , tn) acquired in Equation (17) or (18), thereby acquiring a second power usage total amount d_pay.

$$d\_pay = C2B\_c - Kp\_(t1, t2, \ldots, tn) \pmod{\alpha} \quad (19)$$

The accounting process execution unit 45 performs an accounting process for the use of power in each house that is a target for accounting for a second unitary time based on the second power usage total amount generated by the decryption unit 42 (execution unit).

Figure 6:
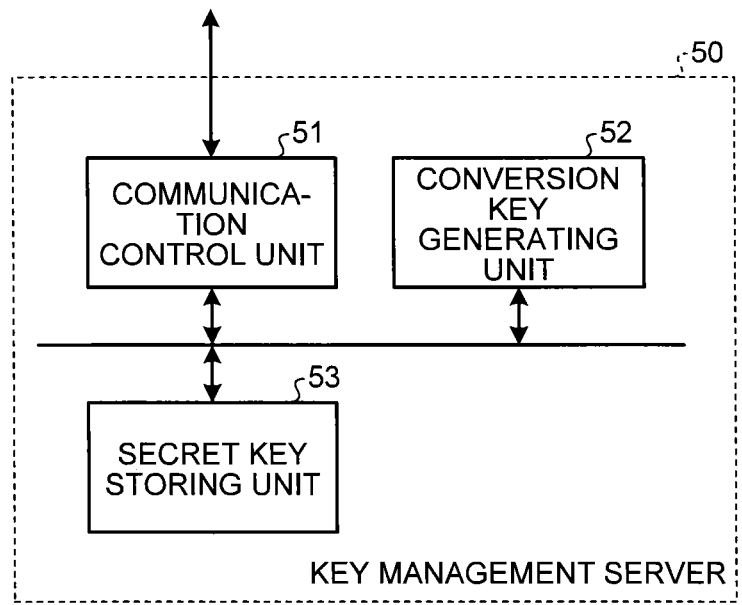
FIG. 6 is a block diagram that illustrates an example of the functional configuration of a key management server.

Next, various functions implemented in the key management server 50 will be described. FIG. 6 is a block diagram that illustrates an example of the functional configuration of the key management server 50. The key management server 50, for example, as illustrated in FIG. 6, is equipped with a communication control unit 51, a conversion key generating unit 52, and a secret key storing unit 53. The function of the communication control unit 51 is implemented by the communication I/F and various programs executed by the CPU. The function of the conversion key generating unit 52 is implemented by various programs executed by the CPU. The secret key storing unit 53, for example, is a storage area that is secured in the auxiliary storage unit.

The communication control unit 51 controls communication with the MDMS 20 that is performed through the network 60. More specifically, the communication control unit 51 receives an acquisition request for a first conversion key or an acquisition request for a second conversion key transmitted from the MDMS 20 or transmits the first conversion key or the second conversion key generated by the conversion key generating unit 52 to be described later to the MDMS 20 as a response to the acquisition request (third transmission unit).

The secret key storing unit 53 stores the above-described secret key Ksm that is shared with the SM 10, the above-described secret key Ke that is shared with the EMS 30, and the above-described secret key Kp that is shared with the accounting server 40.

In accordance with an acquisition request for the first conversion key from the MDMS 20, the conversion key generating unit 52 generates a first conversion key by using the SM_IDs of all the SMs 10 and the time information t included in this acquisition request and the secret keys Ksm and Ke stored in the secret key storing unit 53 (fourth generation unit). In addition, in accordance with an acquisition request for the second conversion key from the MDMS 20, the conversion key generating unit 52 generates a second conversion key by using the SM_IDs of all the SMs 10 and all the time information t1, t2, . . . , tn included in this acquisition request and the secret keys Ksm and Kp stored in the secret key storing unit 53 (fourth generation unit). The first conversion key and the second conversion key generated by the conversion key generating unit 52 are transmitted from the communication control unit 51 to the MDMS 20 through the network 60 as responses to the acquisition requests for the first and second conversion keys.

Here, a specific example of the sequences of generating a first conversion key and a second conversion key that is performed by the conversion key generating unit 52 will be described. First, an example of the sequence of generating a first conversion key in response to the acquisition request for the first conversion key from the MDMS 20 will be described. In the acquisition request Req1 for a first conversion key transmitted from the MDMS 20, as described above, the identification information of the EMS 30, SM_IDs of SMs 10 (here, SMs 10*a*, 10*b*, and 10*c*) of all the houses (all the houses included in the management target area) designated by the EMS 30, and the time information t designated by the EMS 30 are included.

The conversion key generating unit 52, first, extracts the secret key Ke that is stored in the secret key storing unit 53 in association with the identification information of the EMS 30 and the secret keys Ksm_a, Ksm_b, Ksm_c that are stored in the secret key storing unit 53 in association with the SM_IDs of the SMs 10*a*, 10*b*, and 10*c*. Then, the conversion key generating unit 52, as represented in the following Equation (20), generates a first conversion key K(a, b, c, t) by using such secret keys and the time information t.

$$K(a,b,c,t)=h(\text{Ksm}\_a,t)+h(\text{Ksm}\_b,t)+h(\text{Ksm}\_c,t)-h(Ke,t)(\text{mod } \alpha) \quad (20)$$

However, in a case where a stream cipher is used at the time of encryption, the first conversion key K(a, b, c, t) is generated through a calculation represented in the following Equation (21).

$$K(a,b,c,t)=ST(h(\text{Ksm}\_a,t))+ST(h(\text{Ksm}\_b,t))+ST(h(\text{Ksm}\_c,t))-ST(h(Ke,t))(\text{mod } \alpha) \quad (21)$$

Next, an example of the sequence of generating a second conversion key in response to the acquisition request for the second conversion key from the MDMS 20 will be described. In the acquisition request Req2 for the second conversion key transmitted from the MDMS 20, as described above, the identification information of the accounting server 40, the SM_ID of the SM 10 (here, SM 10*a*) of a house (a house that is a target for accounting) designated by the accounting server 40, and the time information t1, t2, . . . , tn of all the first unitary times within the second unitary time designated by the accounting server 40 are included.

The conversion key generating unit 52, first, extracts the secret key Kp that is stored in the secret key storing unit 53 in association with the identification information of the accounting server 40 and the secret key Ksm_a that is stored in the secret key storing unit 53 in association with the SM_ID of the SM 10*a*. Then, the conversion key generating unit 52 generates a second conversion key K(a, t1, t2, . . . , tn) as represented in the following Equation (22) by using such secret keys and the time information t1, t2, . . . , tn.

$$K(a,t1,t2,\ldots,tn)=h(\text{Ksm}\_a,t1)+h(\text{Ksm}\_a,t2)+\ldots+h(\text{Ksm}\_a,tn)-h(Kp,t1,t2,\ldots,tn)(\text{mod } \alpha) \quad (22)$$

However, in a case where a stream cipher is used at the time of encryption, the second conversion key K(a, t1, t2, . . . , tn) is generated through a calculation represented in the following Equation (23).

$$K(a,t1,t2,\ldots,tn)=ST(h(\text{Ksm}\_a,t1))+ST(h(\text{Ksm}\_a,t2))+\ldots+ST(h(\text{Ksm}\_a,tn))-ST(h(Kp,t1,t2,\ldots,tn))(\text{mod } \alpha) \quad (23)$$

Next, the sequences of various processes performed in the power usage calculation system according to this embodiment will be described with reference to flowcharts illustrated in FIGS. 7 to 10.

Figure 7:
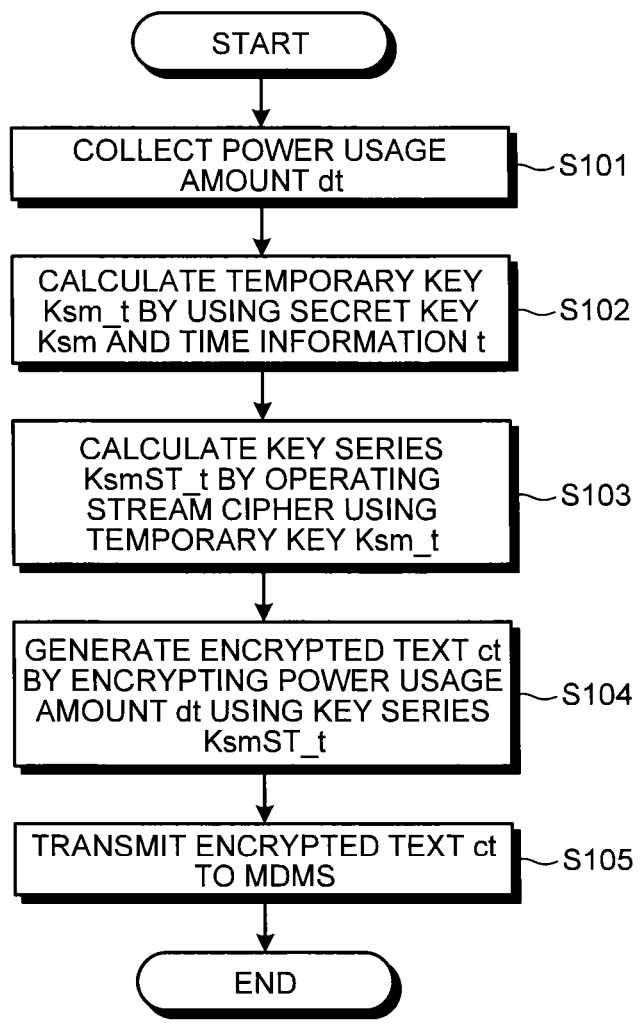
FIG. 7 is a flowchart that illustrates an example of the processing sequence performed by the SM.
Figure 8:
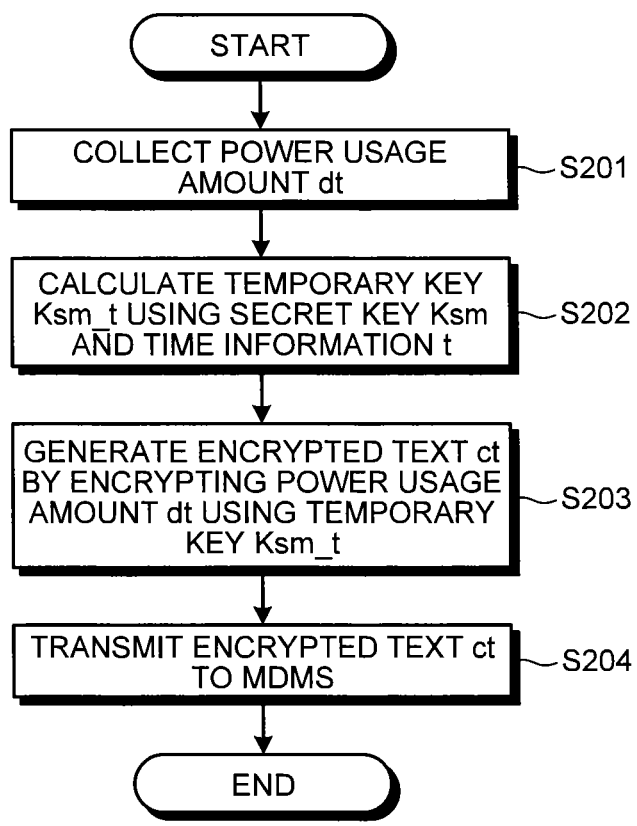
FIG. 8 is a flowchart that illustrates another example of the processing sequence performed by the SM.

First, the sequence of the process until the SM 10 transmits an encrypted text of the power usage amount to the MDMS 20 will be described with reference to FIG. 7. FIG. 7 is a flowchart that illustrates an example of the processing sequence performed by the SM 10.

When the power usage amount dt of electrical devices is collected for every first unitary time in step S101, the SM 10 calculates a temporary key Ksm_t by using the secret key Ksm shared with the key management server 50 and the time information t in step S102.

Next, the SM 10 calculates a key series KsmST_t by operating the stream cipher using the temporary key Ksm_t, which has been calculated in step S102, in step S103. Then, the SM 10 encrypts the power usage amount dt collected in step S101 using the key series KsmST_t calculated in step S103, thereby generating an encrypted text ct in step S104. Then, the SM 10 transmits the encrypted text ct generated in step S104 to the MDMS 20 with being associated with the time information t in step S105. At this time, the SM 10 transmits the SM_ID assigned to the SM 10 as well.

In addition, as described above, for simplification of the process, the SM 10 may encrypt the power usage amount dt by directly using the temporary key Ksm_t that is generated based on the secret key Ksm and the time information t. FIG.

8 is a flowchart that illustrates an example of the processing sequence performed by the SM 10 in a case where the power usage amount dt is encrypted by directly using the temporary key Ksm_t.

In this case, when the power usage amount dt of electrical devices is collected for every first unitary time in step S201, the SM 10 calculates a temporary key Ksm_t by using the secret key Ksm shared with the key management server 50 and the time information t in step S202.

Next, the SM 10 encrypts the power usage amount dt collected in step S201 by using the temporary key Ksm_t calculated in step S202, thereby generating an encrypted text ct in step S203. Then, the SM 10 transmits the encrypted text ct generated in step S203 to the MDMS 20 with being associated with the time information t in step S204. At this time, the SM 10 transmits the SM_ID assigned to the SM 10 as well.

Figure 9:
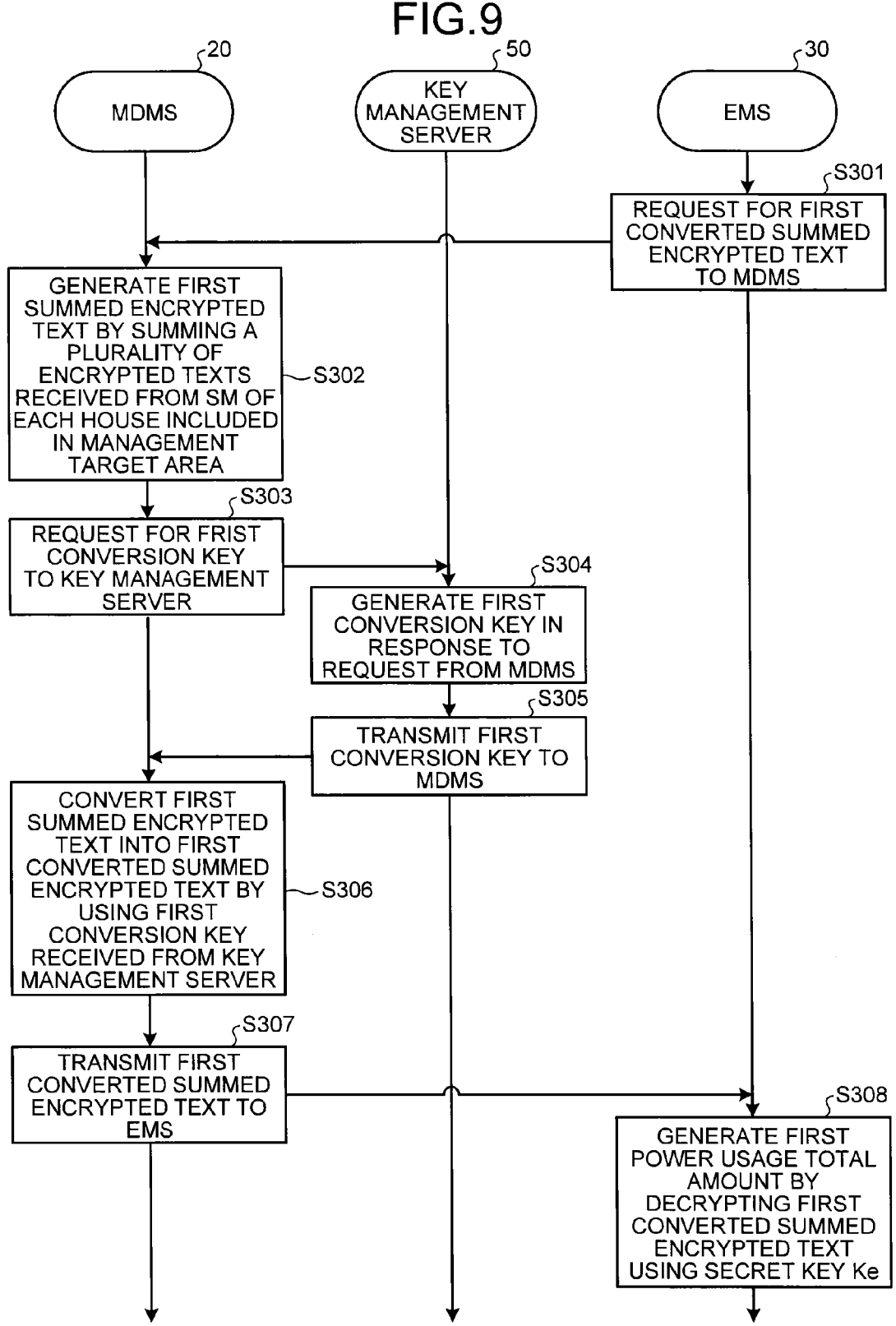
FIG. 9 is a flowchart that illustrates the processing sequence of the EMS, the MDMS, and the key management server.

Next, the sequence of the process until the EMS 30 generates a first power usage total amount will be described with reference to FIG. 9. FIG. 9 is a flowchart that illustrates an example of the processing sequence performed by the EMS 30, the MDMS 20, and the key management server 50.

First, the EMS 30 transmits an acquisition request for a first converted summed encrypted text to the MDMS 20 in step S301. The MDMS 20 that has received the acquisition request for the first converted summed encrypted text from the EMS 30 sums the encrypted texts of the power usage amounts of the first unitary times represented in the time information t received from the SMs 10 of all the houses included in the management target area of the EMS 30, thereby generating a first summed encrypted text in step S302.

Next, the MDMS 20 transmits an acquisition request for a first conversion key to the key management server 50 in step S303. In this acquisition request for a first conversion key, the identification information of the EMS 30, the SM_IDs of SMs 10 of all the houses (all the houses included in the management target area) designated by the EMS 30, and the time information t designated by the EMS 30 are included.

The key management server 50 that has received the acquisition request for a first conversion key from the MDMS 20 generates the first conversion key by using all the SM_IDs and the time information t included in the acquisition request for the first conversion key in step S304. Then, the key management server 50 transmits the first conversion key generated in step S304 to the MDMS 20 as a response to the acquisition request for the first conversion key in step S305.

The MDMS 20 that has received the first conversion key from the key management server 50 converts the first summed encrypted text generated in step S302 into a first converted summed encrypted text by using the received first conversion key in step S306. Then, the MDMS 20 transmits the first converted summed encrypted text generated in step S306 to the EMS 30 as a response to the acquisition request for the first converted summed encrypted text in step S307.

The EMS 30 that has received the first converted summed encrypted text from the MDMS 20 decrypts the first converted summed encrypted text by using the secret key Ke thereof, thereby generating a first power usage total amount in step S308. Thereafter, the EMS 30 performs power control using the first power usage total amount.

Figure 10:
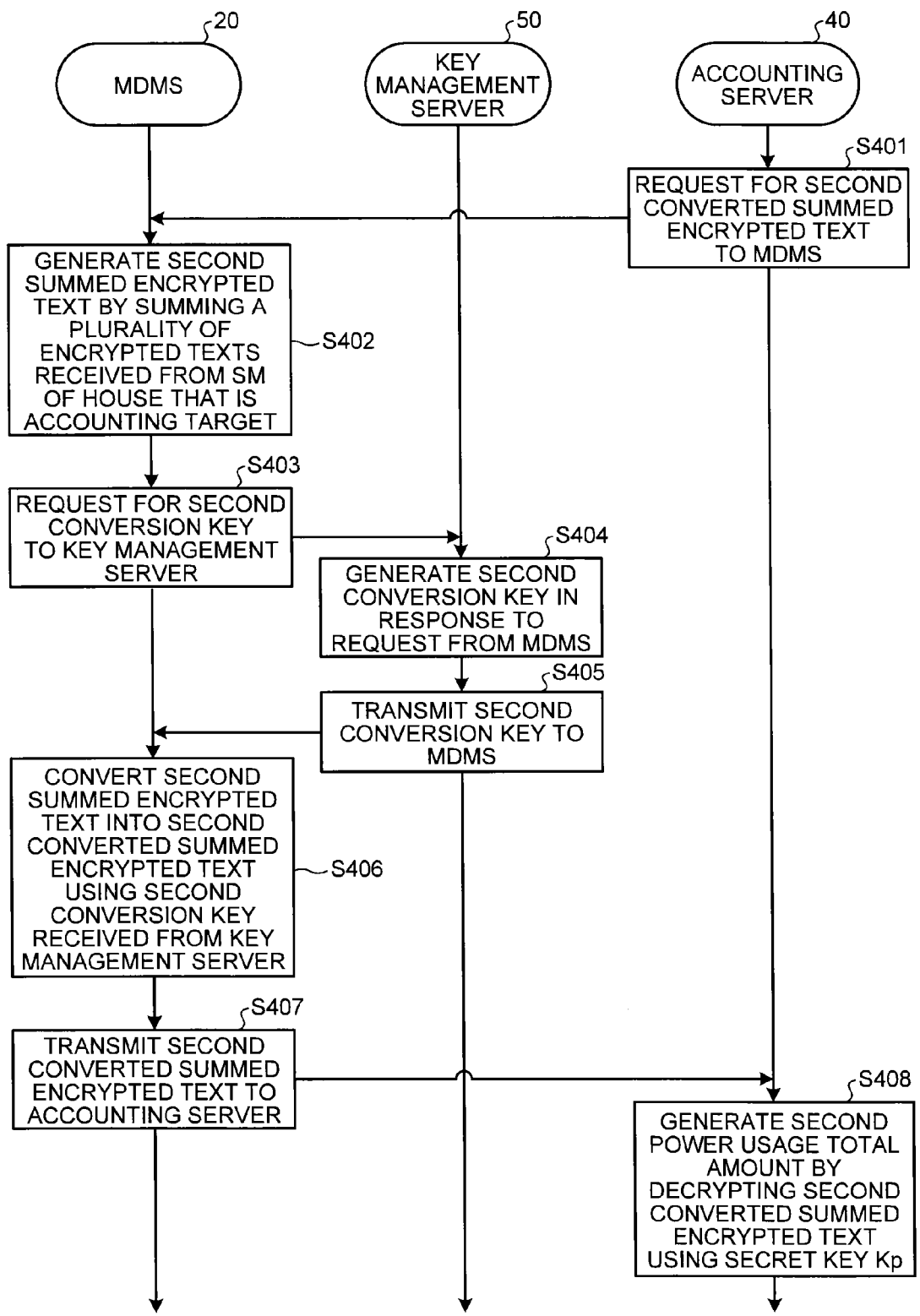
FIG. 10 is a flowchart that illustrates the processing sequence of the accounting server, the MDMS, and the key management server.

Next, the sequence of the process until the accounting server 40 generates the second power usage total amount will be described with reference to FIG. 10. FIG. 10 is a flowchart that illustrates an example of the processing sequence performed by the accounting server 40, the MDMS 20, and the key management server 50.

First, the accounting server 40 transmits an acquisition request for a second converted summed encrypted text to the MDMS 20 in step S401. The MDMS 20 that has received the acquisition request for the second converted summed encrypted text from the accounting server 40 sums the encrypted texts of the power usage amounts for the first unitary times within the second unitary time that have been received from the SM 10 of a house that is a target for accounting, thereby generating the second summed encrypted text in step S402.

Next, the MDMS 20 transmits an acquisition requests for a second conversion key to the key management server 50 in step S403. In this acquisition request for the second conversion key, the identification information of the accounting server 40, the SM_ID of the SM 10 of a house designated by the accounting server 40, and the time information t, t1, . . . , tn of all the first unitary times within the second unitary time designated by the accounting server 40 are included.

The key management server 50 that has received the acquisition request for a second conversion key from the MDMS 20 generates the second conversion key by using the SM_ID and the time information t1, t2, . . . , tn included in the acquisition request for the second conversion key in step S404. Then, the key management server 50 transmits the second conversion key generated in step S404 to the MDMS 20 as a response to the acquisition request for the second conversion key in step S405.

The MDMS 20 that has received the second conversion key from the key management server 50 converts the second summed encrypted text generated in step S402 into a second converted summed encrypted text by using the received second conversion key in step S406. Then, the MDMS 20 transmits the second converted summed encrypted text generated in step S406 to the accounting server 40 as a response to the acquisition request for the second converted summed encrypted text in step S407.

The accounting server 40 that has received the second converted summed encrypted text from the MDMS 20 decrypts the second converted summed encrypted text by using the secret key Kp thereof, thereby generating a second power usage total amount in step S408. Thereafter, the accounting server 40 performs an accounting process by using the second power usage total amount.

As described in detail with reference to the specific examples as above, according to the power usage calculation system of this embodiment, the power usage amount collected by the SM 10 is transmitted to the MDMS 20 as an encrypted text encrypted using the secret key Ksm of the SM 10. Then, in the MDMS 20, in a state in which the original power usage amount is concealed, the first and second converted summed encrypted texts are generated in response to the requests from the EMS 30 and the accounting server 40, the first converted summed encrypted text is transmitted to the EMS 30, and the second converted summed encrypted text is transmitted to the accounting server 40. Then, the EMS 30 decrypts the first converted summed encrypted text using the secret key Ke thereof, thereby a first power usage total amount is acquired. In addition, the accounting server 40 decrypts the second converted summed encrypted text using the secret key Kp thereof, thereby a second power usage total amount is acquired. In this manner, according to the power usage calculation system of this embodiment, the total amount of power usage needed by applications can be acquired in the state in which the power usage amount is concealed, whereby the privacy is protected, and various applications using the total amount of power usage can be appropriately performed.

In addition, according to the power usage calculation system of this embodiment, the secret key Ksm used for encrypting the power usage amount in the SM 10, the secret key Ke used for decrypting the first converted summed encrypted text in the EMS 30, and the secret key Kp used for decrypting the second converted summed encrypted text in the accounting server 40 are managed by the key management server 50. Then, the key management server 50 generates the first and second conversion keys using such secret keys, the MDMS 20 transmits the first converted summed encrypted text generated using the first conversion key to the EMS 30 and transmits the second converted summed encrypted text generated using the second conversion key to the accounting server 40, whereby, the EMS 30 can acquire the first power usage total amount, and the accounting server 40 can acquire the second power usage total amount. Accordingly, in order to acquire a total amount of power usages that is requested from the other applications such as the power control or the accounting process, the SM 10 does not need to encrypt the power usage amount using a secret key different for each application but may encrypt the power usage amount using one secret key Ksm shared with the key management server 50 and transmit the encrypted text to the MDMS 20. In this manner, according to the power usage calculation system of this embodiment, the total amount of power usages that is needed from various applications can be acquired while the privacy is protected without incurring an excessive load in the SM 10.

Modification 1 of First Embodiment

In the first embodiment described above, the encryption unit 12 of the SM 10 acquires the encrypted text ct by adding the key series KsmST_t of the stream cipher to the power usage amount dt. In contrast to this, in this modification, the encryption unit 12 of the SM 10 acquires ct by adding the key series KsmST_t of the stream cipher to the power usage amount dt and generates an encrypted text (ct', ft) using a flag ft representing whether the acquired ct is dt_max, which is a maximum value of the power usage amount measured by the SM 10, or more. In other words, in a case where the acquired ct is less than dt_max, the value of the flag ft is set to zero, and a combination (ct, 0) of ct and the flag "0" is formed as the encrypted text of the power usage amount dt. On the other hand, in a case where the acquired ct is dt_max or more, the value of the flag ft is set to one, and a combination (ct−dt_max, 1) of a difference between ct and dt_max, and the flag "1" is set as the encrypted text of the power usage amount dt. In this modification, the range of Ksm_t is zero or more and dt_max (here, dt_max is a maximum value of the power usage amount measured by the SM 10) or less.

Hereinafter, differences between a specific example of the process according to this modification and the above-described first embodiment will be described.

In this modification, the encryption unit 12 of the SM 10, first, calculates ct using the following Equation (2').

$$ct=dt+KsmST\_t \quad (2')$$

Next, in a case where ct is less than dt_max, the encryption unit 12 acquires (ct', ft) using the following Equation (24).

$$(ct',ft)=(ct,0) \quad (24)$$

On the other hand, in a case where ct is dt_max or more, the encryption unit 12 acquires (ct', ft) using the following Equation (25).

$$(ct',ft)=(ct-dt\_max,1) \quad (25)$$

In this modification, (ct', ft) acquired in this manner is the encrypted text acquired by encrypting the power usage amount dt.

In addition, since the time information t is necessary information in the subsequent process, similarly to the first embodiment described above, the time information is transmitted to the MDMS 20 with being accompanied by the encrypted text. Hereinafter, it is assumed that data Csm_t= (ct', ft, t) in which the encrypted text (ct', ft) and the time information t are associated with each other is treated as the encrypted text of the power usage amount dt.

Next, an example of the sequence of generating the first summed encrypted text using the summation unit 24 of the MDMS 20 will be described. Here, similarly to the first embodiment described above, a case will be described as an example in which a first summed encrypted text Csm_1A (abc)_(t) is acquired by summing encrypted texts Csm_a_t, Csm_b_t, and Csm_c_t of the power usage amounts of three SMs 10 (SMs 10a, 10b, and 10c) at the first unitary time represented by the time information t.

In the case of this modification, Csm_a_t, Csm_b_t, and Csm_c_t are represented as in the following Equations (4') to (6').

$$Csm\_a\_t=(ct'\_a,ft\_a,t) \quad (4')$$

$$Csm\_b\_t=(ct'\_b,ft\_b,t) \quad (5')$$

$$Csm\_c\_t=(ct'\_c,ft\_c,t) \quad (6')$$

Then, the summation unit 24 can acquire the first summed encrypted text Csm_1A(abc)_(t) using the following Equation (7').

$$Csm\_1A(abc)\_(t)=(C1A\_c,C1A\_f,t) \quad (7')$$

Here, $C1A\_c=ct'\_a+ct'\_b+ct'\_c, C1A\_f=ft\_a+ft\_b+ft\_c$.

Next, an example of the sequence of generating the second summed encrypted text using the summation unit 24 of the MDMS 20 will be described. Here, similarly to the first embodiment described above, a case will be described as an example in which the second summed encrypted text Csm_2A(a)_(t1, t2, ..., tn) is acquired by summing the encrypted texts Csm_a_t1, Csm_a_t2, ..., Csm_a_tn of the power usage amounts at each first unitary time included in the second unitary time received from the SM 10a of a house that is a target for accounting.

In this modification, Csm_a_t1, Csm_a_t2, ..., Csm_a_tn are represented as in the following Equations (8') to (10').

$$Csm\_a\_t1=(ct'\_t1\_a,ft\ t1\ a,t1) \quad (8')$$

$$Csm\_a\_t2=(ct'\_t2\_a,ft\_t2\_a,t1) \quad (9')$$

...

$$Csm\_a\_tn=(ct'\_tn\_a,ft\_tn\_a,tn) \quad (10')$$

Then, the summation unit 24 can acquire a second summed encrypted part Csm_2A(a)_(t1, t2, ..., tn) by using the following Equation (11').

$$Csm\_2A(a)\_(t1,t2, \ldots ,tn)=(C2A\_c,C2A\_f,t1,t2,\ldots,tn) \quad (11')$$

Here, $C2A\_c=ct'\_t1\_a+ct'\_t2\_a+\ldots+ct'\_tn\_a$, and $C2A\_f=ft\_t1\_a+ft\_t2\_a+\ldots+ft\_tn\_a$.

In the case of this modification, the conversion unit 25 of the MDMS 20 can acquire a first converted summed encrypted text Csm_1B(abc)_(t) using the first conversion key K(a, b, c, t) received from the key management server 50 in accordance with the following Equation (12').

$$Csm\_1B(abc)\_(t)=(C1B\_c, C1B\_f, t) \quad (12')$$

Here, $C1B\_c = C1A\_c - K(a,b,c,t)$, $C1B\_f = C1A\_f$.

In addition, in the case of this modification, the conversion unit 25 of the MDMS 20 can acquire a second converted summed encrypted text $Csm\_2B(a)\_(t1, t2, \ldots, tn)$ by using the second conversion key $K(a, t1, t2, \ldots, tn)$ received from the key management server 50 in accordance with the following Equation (13').

$$Csm\_2B(a)\_(t1,t2, \ldots, tn)=(C2B\_c, C2B\_f, t1, t2, \ldots, tn) \quad (13')$$

Here, $C2B\_c = C2A\_c - K(a,t1,t2,\ldots,tn)$, and $C2B\_f = C2A\_f$.

Next, a case of the sequence of generating a first power usage total amount by decrypting the first converted summed encrypted text using the secret key Ke, which is performed by the decryption unit 32 of the EMS 30, will be described. Here, a case will be described as an example in which the communication control unit 31 receives a first converted summed encrypted text $Csm\_1B(abc)\_(t)=(C1B\_c, C1B\_f, t)$ from the MDMS 20.

Similarly to the first embodiment described above, the decryption unit 32, first, performs a calculation represented by Equation (14) or (15) described above by using the time information t included in the first converted summed encrypted text received from the MDMS 20 and the secret key Ke thereof, thereby acquiring Ke_t.

Next, the decryption unit 32 performs a calculation represented in Equation (16') by using Ke_t acquired in Equation (14) or (15), thereby acquiring a first power usage total amount d_EMS.

$$d\_EMS = C1B\_c - Ke\_t + C1B\_f \times dt\_\max \quad (16')$$

Next, an example of the sequence of generating a second power usage total amount by decrypting the second converted summed encrypted text by using the secret key Kp, which is performed by the decryption unit 42 of the accounting server 40, will be described. Here, a case will be described as an example in which a second converted summed encrypted text $Csm\_2B(a)\_(t1, t2, \ldots, tn)=(C2B\_c, C2B\_f, t1, t2, \ldots, tn)$ is received by the communication control unit 41 from the MDMS 20.

The decryption unit 42, similarly to the first embodiment described above, first, performs a calculation represented by Equation (17) or (18) described above using the time information $t1, t2, \ldots, tn$ included in the second converted summed encrypted text received from the MDMS 20 and the secret key Kp thereof, thereby acquiring $Kp\_(t1, t2, \ldots, tn)$.

Next, the decryption unit 42 performs a calculation represented in the following Equation (19') by using $Kp\_(t1, t2, \ldots, tn)$ acquired in Equation (17) or (18), thereby acquiring a second power usage total amount d_pay.

$$d\_pay = C2B\_c - Kp\_(t1,t2,\ldots,tn) + C2B\_f \times dt\_\max \quad (19')$$

Next, an example of the sequence of generating a first conversion key using the conversion key generating unit 52 of the key management server 50 will be described. Here, similarly to the first embodiment described above, the SMs 10 of all the houses (all the houses included in the management target area) designated by the EMS 30 are assumed to be SMs 10a, 10b, and 10c.

The conversion key generating unit 52, similarly to the first embodiment described above, first, extracts the secret key Ke that is stored in the secret key storing unit 53 in association with the identification information of the EMS 30 and the secret keys Ksm_a, Ksm_b, Ksm_c that are stored in the secret key storing unit 53 in association with the SM_IDs of the SMs 10a, 10b, and 10c.

Then, the conversion key generating unit 52, as represented in the following Equation (20'), generates a first conversion key K(a, b, c, t) by using such secret keys and the time information t.

$$K(a,b,c,t) = h(Ksm\_a,t) + h(Ksm\_b,t) + h(Ksm\_c,t) - h(Ke,t) \quad (20')$$

However, in a case where a stream cipher is used at the time of encryption, the first conversion key K(a, b, c, t) is generated through a calculation represented in the following Equation (21').

$$K(a,b,c,t) = ST(h(Ksm\_a,t)) + ST(h(Ksm\_b,t)) + ST(h(Ksm\_c,t)) - ST(h(Ke,t)) \quad (21')$$

Next, an example of the sequence of generating a second conversion key using the conversion key generating unit 52 of the key management server 50 will be described. Here, similarly to the first embodiment described above, it is assumed that the SM 10 of a house (a house that is a target for accounting) designated by the accounting server 40 is an SM 10a, and the time information of all the first unitary times within the second unitary time designated by the accounting server 40 is $t1, t2, \ldots, tn$.

The conversion key generating unit 52, similarly to the first embodiment described above, first, extracts the secret key Kp that is stored in the secret key storing unit 53 in association with the identification information of the accounting server 40 and the secret key Ksm_a that is stored in the secret key storing unit 53 in association with the SM_ID of the SM 10a.

Then, the conversion key generating unit 52 generates a second conversion key $K(a, t1, t2, \ldots, tn)$ as represented in the following Equation (22') by using such secret keys and the time information $t1, t2, \ldots, tn$.

$$K(a,t1,t2,\ldots,tn) = h(Ksm\_a,t1) + h(Ksm\_a,t2) + \ldots + h(Ksm\_a,tn) - h(Kp,t1,t2,\ldots,tn) \quad (22')$$

However, in a case where a stream cipher is used at the time of encryption, the second conversion key $K(a, t1, t2, \ldots, tn)$ is generated through a calculation represented in the following Equation (23').

$$K(a,t1,t2,\ldots,tn) = ST(h(Ksm\_a,t1)) + ST(h(Ksm\_a,t2)) + \ldots + ST(h(Ksm\_a,tn)) - ST(h(Kp,t1,t2,\ldots,tn)) \quad (23')$$

The other processes in this modification are the same as those of the first embodiment described above, and thus, description thereof will not be presented.

As described above, in this modification, the encryption unit 12 of the SM 10 acquires ct by adding the key series KsmST_t of the stream cipher to the power usage amount dt and generates an encrypted text (ct', ft) using the flag ft representing whether the acquired ct is dt_max, which is a maximum value of the power usage amount measured by the SM 10, or more. Therefore, according to this modification, the data size of the encrypted text of the power usage amount dt is decreased, whereby the memory resources can be effectively utilized, and the calculation process can be efficiently performed.

Modification 2 of First Embodiment

In Modification 1 described above, the range of Ksm_t is zero or more and less than dt_max (dt_max is a maximum value of the power usage amount measured by the SM 10). In this modification, the range of Ksm_t is zero or more and less than ct_max (here, ct_max is an integer value of one or more).

According to this modification, by setting ct_max to have a value less than dt_max, the value of ct can be smaller than that of Modification 1 described above, whereby the storage capacity used for storing ct can be further reduced.

Hereinafter, differences between a specific example of the process according to this modification and the above-described Modification 1 will be described.

In this modification, the encryption unit 12 of the SM 10 calculates ct using Equation (2') described above and then, acquires an encrypted text (ct', ft) acquired by encrypting the power usage amount dt using the following Equation (26).

$$(ct', ft) = (ct \bmod ct\_max, Q(ct, ct\_max)) \quad (26)$$

Here, Q(a, b) is the quotient acquired by dividing an integer a by b. In this modification, the flag ft may have a value other than zero and one. From this, the data size of the encrypted text of the power usage amount dt can be decreased, whereby the memory resources can be effectively utilized, and the calculation process can be efficiently performed.

In this modification, the sequence of generating a summed encrypted text by summing a plurality of encrypted texts using the summation unit 24 of the MDMS 20 is the same as that of Modification 1 described above. In addition, in this modification, the sequence of converting the first summed encrypted text into a first converted summed encrypted text using the conversion unit 25 of the MDMS 20, and the sequence of converting the second summed encrypted text into a second converted summed encrypted text are the same as those of Modification 1 described above.

In this modification, the decryption unit 32 of the EMS 30 acquires Ke_t using Equation (14) or (15) described above and then performs a calculation represented in the following Equation (16") using this Ke_t, thereby acquiring a first power usage total amount d_EMS.

$$d\_EMS = C1B\_c - Ke\_t + C1B\_f \times ct\_max \quad (16'')$$

In addition, in this modification, the decryption unit 42 of the accounting server 40 acquires Kp_(t1, t2, . . . , tn) using Equation (17) or (18) described above and then, performs a calculation represented in the following Equation (19") using Kp_(t1, t2, . . . , tn), thereby acquiring a second power usage total amount d_pay.

$$d\_pay = C2B\_c - Kp\_(t1, t2, \ldots, tn) + C2B\_f \times ct\_max \quad (19'')$$

The other processes in this modification are the same as those of the first embodiment and Modification 1 described above, and thus, description thereof will not be presented.

Modification 3 of First Embodiment

In Modifications 1 and 2 described above, the value of the flag ft is stored in the power usage amount storing unit 23 without being concealed. At this time, in a case where the flag ft corresponding to an encrypted text ct is zero, the encrypted text ct can be written as ct=dt+KsmST_t≥dt, and it can be inferred that the power usage amount dt is zero or more and ct or less. On the other hand, for example, in Modification 1 described above, in a case where the flag ft corresponding to an encrypted text ct is one, the encrypted text ct can be written as ct=dt+KsmST_t−dt_max≤dt+dt_max−dt_max=dt, and it can be inferred that dt is ct or more and dt_max or less.

As above, in a case where the value of the flag ft is not concealed, information of the power usage amount dt is partly leaked based on the value of the flag ft. Thus, in this modification, by concealing the value of the flag ft, it is difficult to infer the power usage amount dt. Hereinafter, while a method of concealing the value of the flag ft in Modification 1 described above will be described as an example, the value of the flag ft may be concealed in the same manner also in Modification 2 described above.

Hereinafter, differences between a specific example of the process according to this modification and the above-described Modification 1 will be described.

In Modification 1 described above, the secret key storing unit 15 of the SM 10 stores the secret key represented in Equation (1). In contrast to this, the secret key storing unit 15 of the SM 10 according to this modification stores a secret key represented in the following Equation (1').

$$(Ksm\_t, K'sm\_t) = h(Ksm, t) \quad (1')$$

Here, the range of Ksm_t is zero or more and less than dt_max, and K'sm_t is the value of an ft_bit bit (here, ft_bit is an integer of one or more, and, in a case where this modification is applied to Modification 2 described above, it is preferable that ft_bit has a value that is the bit length of a maximum value that can be taken by the flag ft in Modification 2 described above or more).

In this modification, the encryption unit 12 of the SM 10, first, calculates (ct', ft) in the same sequence as that of Modification 1 described above based on Equation (24) or (25) described above. Next, the encryption unit 12 calculates ft'=ft(+)K'smST_(here, (+) represents an exclusive OR operation for each bit) and outputs (ct', ft') as an encrypted text.

Next, an example of the sequence of generating a first summed encrypted text using the summation unit 24 of the MDMS 20 will be described. Here, similarly to Modification 1 described above, a case will be described as an example in which a first summed encrypted text Csm_1A(abc)_(t) is acquired by summing encrypted texts Csm_a_t, Csm_b_t, and Csm_c_t of the power usage amounts of three SMs 10 (SMs 10*a*, 10*b*, and 10*c*) at the first unitary time represented by time information t.

In the case of this modification, Csm_a_t, Csm_b_t, and Csm_c_t are represented as in the following Equations (4") to (6").

$$Csm\_a\_t = (ct'\_a, ft'\_a, t) \quad (4'')$$

$$Csm\_b\_t = (ct'\_b, ft'\_b, t) \quad (5'')$$

$$Csm\_c\_t = (ct'\_c, ft'\_c, t) \quad (6'')$$

Then, the summation unit 24 can acquire a first summed encrypted text Csm_1A(abc)_(t) by using the following Equation (7").

$$Csm\_1A(abc)\_(t) = (C1A\_c, C1A'\_f, t) \quad (7'')$$

Here, $C1A\_c = ct'\_a + ct'\_b + ct'\_c$ and $C1A'\_f = (ft\_a(+) K'smST\_t\_a) + (ft\_b(+) K'smST\_t\_b) + (ft\_c(+) K'smST\_t\_c)$, and $K'smST\_t\_i$ is a second component calculated for the i-th SM 10 using Equation (1').

Next, an example of the sequence of generating a second summed encrypted text using the summation unit 24 of the MDMS 20 will be described. Here, similarly to Modification 1 described above, a case will be described as an example in which a second summed encrypted text Csm_2A(a)_(t1, t2, . . . , tn) is acquired by summing encrypted texts Csm_a_t1, Csm_a_t2, . . . , Csm_a_tn of the power usage amounts at each first unitary time included in the second unitary time received from the SM 10*a* of the house that is a target for accounting.

In the case of this modification, Csm_a_t1, Csm_a_t2, ..., Csm_a_tn are represented as in the following Equations (8") to (10").

$$Csm\_a\_t1=(ct'\_t1\_a, ft'\_t1\_a, t1) \quad (8'')$$

$$Csm\_a\_t2=(ct'\_t2\_a, ft'\_t2\_a, t2) \quad (9'')$$

...

$$Csm\_a\_tn=(ct'\_tn\_a, ft'\_tn\_a, tn) \quad (10'')$$

Then, the summation unit 24 can acquire a second summed encrypted part Csm_2A(a)_(t1, t2, ..., tn) by using the following Equation (11").

$$Csm\_2A(a)\_(t1, t2, \ldots, tn) = (C2A\_c, C2A\_f, t1, t2, \ldots, tn) \quad (11'')$$

Here, $C2A\_c=ct'\_t1\_a+ct'\_t2\_a+\ldots+ct'\_tn\_a$, $C2A'\_f=(ft\_t1\_a(+)K'smST\_t1\_a)+(ft\_t2\_a(+)K'smST\_t2\_a)+\ldots+(ft\_tn\_a(+)K'smST\_tn\_a)$.

The other processes in this modification are the same as those of the first embodiment and Modification 1 described above, and thus, description thereof will not be presented.

Modification 4 of First Embodiment

In Modification 3, in order to conceal the value of the flag ft, an exclusive OR operation for each bit is used. In contrast to this, in this modification, in order to conceal the value of the flag ft, arithmetic addition is used instead of an exclusive OR operation for each bit. Also in this modification, similarly to Modification 3, while a method of concealing the value of the flag ft in Modification 1 described above as an example will be described, the value of the flag ft may be concealed in the same manner also in Modification 2 described above.

Hereinafter, differences between a specific example of the process according to this modification and the above-described Modification 1 will be described.

The secret key storing unit 15 of the SM 10 according to Modification 1 described above stores the secret key represented in Equation (1). In contrast to this, the secret key storing unit 15 of the SM 10 according to this modification stores a secret key represented in the following Equation (1").

$$Ksm\_t, K''sm\_t)=h(Ksm, t) \quad (1'')$$

Here, the range of Ksm_t is zero or more and less than dt_max, and K"sm_t is a value that is zero or more and ft_max or less.

In this modification, the encryption unit 12 of the SM 10, first, in the same sequence as that of Modification 1 described above, calculates (ct', ft) based on Equation (24) or (25) described above. Next, the encryption unit 12 calculates ft"=ft+K"smST_t and outputs (ct', ft") as an encrypted text.

Next, an example of the sequence of generating the first summed encrypted text using the summation unit 24 of the MDMS 20 will be described. Here, similarly to Modification 1 described above, a case will be described as an example in which a first summed encrypted text Csm_1A(abc)_(t) is acquired by summing encrypted texts Csm_a_t, Csm_b_t, and Csm_c_t of the power usage amounts of three SMs 10 (SMs 10a, 10b, and 10c) at the first unitary time represented by the time information t.

In the case of this modification, Csm_a_t, Csm_b_t, and Csm_c_t are represented in the following Equations (4''') to (6''').

$$Csm\_a\_t=(ct'\_a, ft''\_a, t) \quad (4''')$$

$$Csm\_b\_t=(ct'\_b, ft''\_b, t) \quad (5''')$$

$$Csm\_c\_t=(ct'\_c, ft''\_c, t) \quad (6''')$$

Then, the summation unit 24 can acquire a first summed encrypted text Csm_1A(abc)_(t) using the following Equation (7''').

$$Csm\_1A(abc)\_(t)=(C1A\_c, C1A''\_f, t) \quad (7''')$$

Here, $C1A\_c=ct'\_a+ct'\_b+ct'\_c, C1A''\_f=(ft\_a+K''smST\_t\_a)+(ft\_b+K''smST\_t\_b)+(ft\_c+K''smST\_t\_c)$, and $K''smST\_t\_i$ is a second component calculated for the i-th SM 10 using Equation (1'').

Next, an example of the sequence of generating a second summed encrypted text using the summation unit 24 of the MDMS 20 will be described. Here, similarly to Modification 1 described above, a case will be described as an example in which a second summed encrypted text Csm_2A(a)_(t1, t2, ..., tn) is acquired by summing encrypted texts Csm_a_t1, Csm_a_t2, ..., Csm_a_tn of the power usage amounts at each first unitary time included in the second unitary time received from the SM 10a of a house that is a target for accounting.

In the case of this modification, Csm_a_t1, Csm_a_t2, ..., Csm_a_tn are represented as in the following Equations (8''') to (10''').

$$Csm\_a\_t1=(ct'\_t1\_a, ft''\_t1\_a, t1) \quad (8''')$$

$$Csm\_a\_t2=(ct'\_t2\_a, ft''\_t2\_a, t2) \quad (9''')$$

...

$$Csm\_a\_tn=(ct'\_tn\_a, ft''\_tn\_a, tn) \quad (10''')$$

Then, the summation unit 24 can acquire a second summed encrypted part Csm_2A(a)_(t1, t2, ..., tn) by using the following Equation (11''').

$$Csm\_2A(a)\_(t1, t2, \ldots, tn) = (C2A\_c, C2A''\_f, t1, t2, \ldots, tn) \quad (11''')$$

Here, $C2A\_c=ct'\_t1\_a+ct'\_t2\_a+\ldots+ct'\_tn\_a$, and $C2A''\_f=(ft\_t1\_a-K''smST\_t1\_a)+(ft\_t2\_a-K''smST\_t2\_a)+\ldots+(ft\_tn\_a-K''smST\_tn\_a)$.

The other processes in this modification are the same as those of the first embodiment and Modification 1 described above, and thus, description thereof will not be presented.

Second Embodiment

Next, a power usage calculation system according to a second embodiment will be described. The power usage calculation system according to the second embodiment calculates a key element of the conversion key in a possible range in advance before the key management server 50 receives an acquisition request for the conversion key from the MDMS 20, whereby the responsiveness to the acquisition request for the conversion key is improved. The basic configuration of the power usage calculation system and the process of each device except for a key management server 50 are the same as those of the first embodiment, and thus, hereinafter, only the key management server 50 that is a main feature in the second embodiment will be described, and duplicate description of the first embodiment will not be presented. Hereinafter, the key management server 50 according to the second embodiment will be denoted by the key management server 50A so as to be discriminated from that of the first embodiment.

Figure 11:
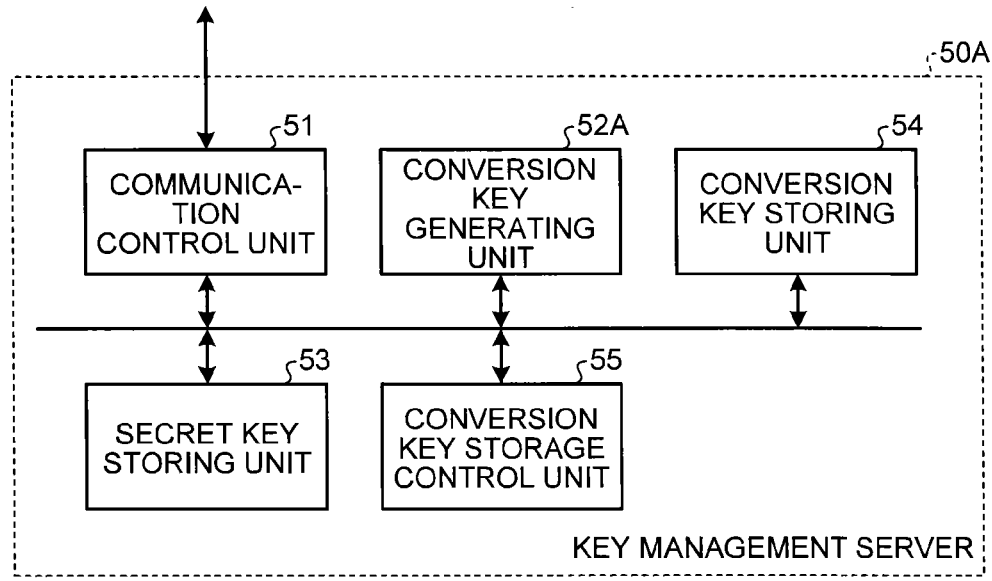
FIG. 11 is a block diagram that illustrates another example of the functional configuration of the key management server.

FIG. 11 is a block diagram that illustrates an example of the functional configuration of the key management server 50A according to the second embodiment. The key management server 50A, for example, as illustrated in FIG. 11, in addition to the configuration of the key management server 50 according to the first embodiment, is equipped with a conversion key storing unit 54 and a conversion key storage control unit 55. In addition, the key management server 50A is equipped with a conversion key generating unit 52A instead of the conversion key generating unit 52 included in the key management server 50 according to the first embodiment. The functions of the conversion key generating unit 52A and the conversion key storage control unit 55 are implemented by various programs executed by the CPU. The conversion key storing unit 54, for example, is a storage area secured in the auxiliary storage unit.

The conversion key generating unit 52A calculates key elements of the first and second conversion keys in advance before the acquisition request for the first conversion key or the second conversion key is received from the MDMS 20. In other words, the first conversion key, as represented in Equation (22) or (23) described above, is key information acquired by combining a plurality of key elements corresponding to a plurality of encrypted texts having the same time information t and mutually-different SM_IDs. In addition, the second conversion key, as represented in Equation (24) or (25) described above, is key information acquired by combining a plurality of key elements corresponding to a plurality of encrypted texts having the same SM_ID and mutually-different time information t. Here, the length of the first unitary time is fixed, and accordingly, the value of the time information t can be recognized in advance by the key management server 50. In addition, the secret key Ksm corresponding to the SM_ID is stored in the secret key storing unit 53. Accordingly, individual key elements configuring the first conversion key or the second conversion key can be calculated in advance by the key management server 50 without waiting for an acquisition request from the MDMS 20.

Accordingly, the conversion key generating unit 52A generates key elements of the first and second conversion keys in a possible range when the key management server 50 is in the idle state, in other words, when the key management server 50 waits for the transmission of the acquisition request for the first conversion key or the second conversion key from the MDMS 20. Then, when the communication control unit 51 receives the acquisition request for the first conversion key or the second conversion key from the MDMS 20, in a case where there is a key element that cannot be calculated in advance, the conversion key generating unit 52A calculates only the key element, necessary key elements are specified from the time information t and the SM_ID included in the acquisition request, and the specified key elements are combined, whereby the first conversion key or the second conversion key is generated. In this way, the conversion key generating unit 52A calculates key elements of the first and second conversion keys in advance in a possible range, whereby the responsiveness to the acquisition request for the first conversion key or the second conversion key can be improved.

The conversion key storing unit 54 stores the key elements of the first and second conversion keys calculated by the conversion key generating unit 52A. The conversion key storing unit 54 has a first storage area used for storing the key elements of the first conversion key and a second storage area used for storing the key elements of the second conversion key. The key elements of the first conversion key that are calculated by the conversion key generating unit 52A are stored in the first storage area by the conversion key storage control unit 55, and the key elements of the second conversion key that are calculated by the conversion key generating unit 52A are stored in the second storage area by the conversion key storage control unit 55.

The conversion key storage control unit 55 distributes the key elements of the first and second conversion keys, which are calculated by the conversion key generating unit 52A, so as to be stored in the first and second storage areas of the conversion key storing unit 54. At this time, in a case where a key element calculated by the conversion key generating unit 52A is common to the first and second conversion keys, the conversion key storage control unit 55 stores the key element in the first and second storage areas of the conversion key storing unit 54.

Figure 12:
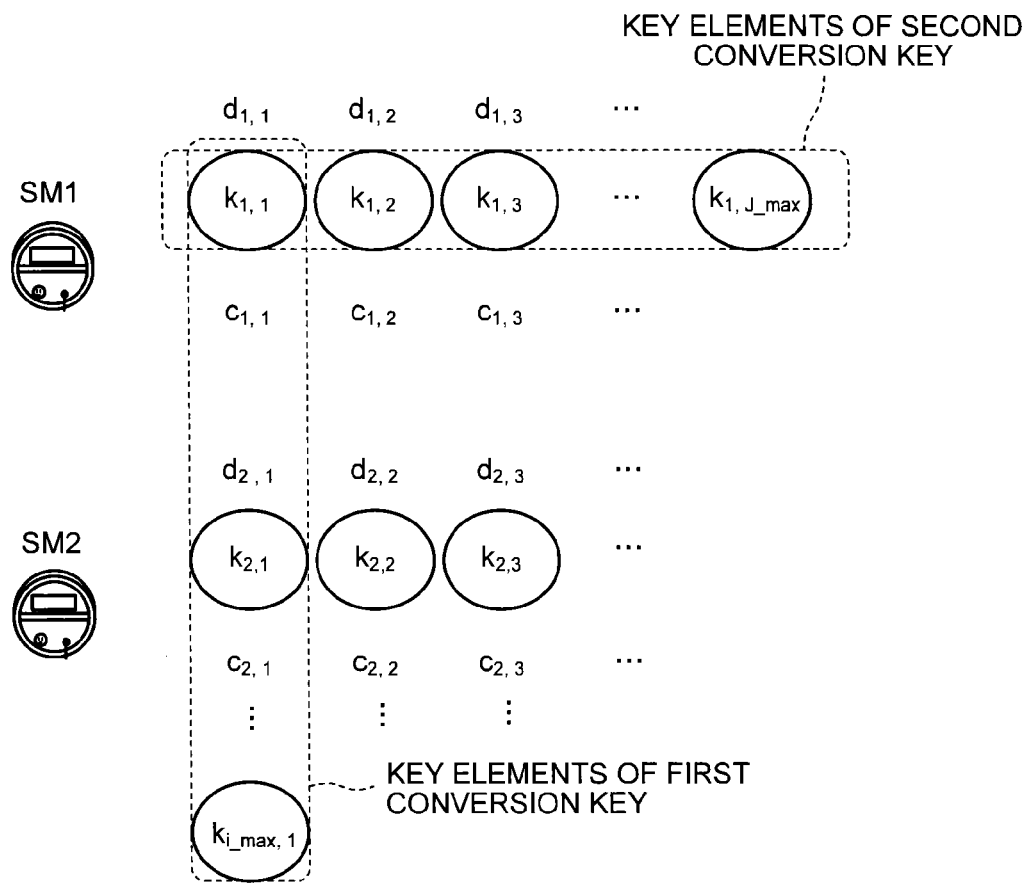
FIG. 12 is a schematic diagram that conceptually illustrates key elements of first and second conversion keys.

FIG. 12 is a schematic diagram that conceptually illustrates key elements of the first and second conversion keys. In FIG. 12, $d_{i,j}$ represents the power usage amount collected by the SM(i) at time information t=j, $k_{i,j}$ represents a key element used for encrypting/decrypting $d_{i,j}$, and $c_{i,j}$ represents an encrypted text as a result of encrypting using $k_{i,j}$.

In the example illustrated in FIG. 12, for example, the first conversion key used for converting the first summed encrypted text acquired by summing encrypted texts of power usage amounts collected by a plurality of SM(i)s at the time information t=1 into a first converted summed encrypted text includes key elements of $k_{1,1}, k_{2,1}, k_{3,1}, \ldots, k_{i\_max,1}$. In addition, the second conversion key used for converting the second summed encrypted text acquired by summing encrypted texts of power usage amounts collected by SM(1) at a plurality of pieces of time information t=i into a second converted summed encrypted text includes key elements of $k_{1,1}, k_{1,2}, k_{1,3}, \ldots, k_{1,j\_max}$. Among such key elements, $k_{1,1}$ is a key element that is common to the first and second conversion keys. In the case of this example, when the key element $k_{1,1}$ is calculated in advance by the conversion key generating unit 52A, the conversion key storage control unit 55 stores the key element $k_{1,1}$ in both the first and second storage areas of the conversion key storing unit 54. In this way, in a case where a key element common to the first and second conversion keys is calculated in advance by the conversion key generating unit 52A, the conversion key storage control unit 55 stores the key element in both the first and second storage areas of the conversion key storing unit 54, whereby the number of calculations of the key elements performed by the conversion key generating unit 52A is decreased, and the process can be efficiently performed.

Figure 13:
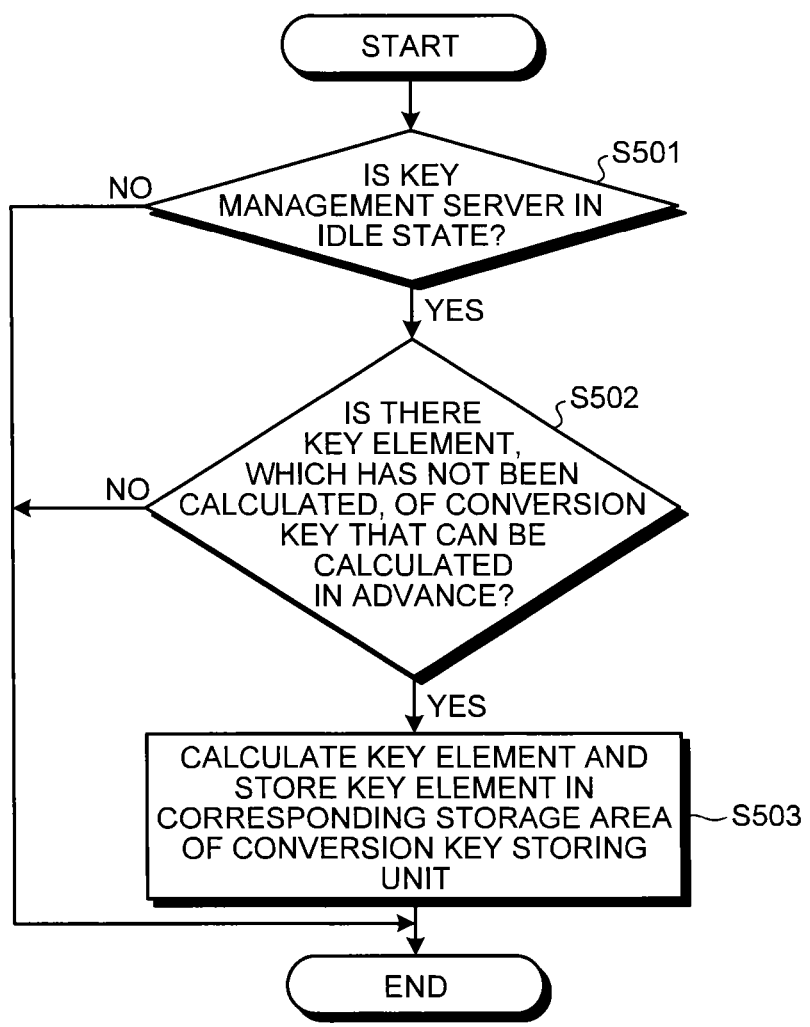
FIG. 13 is a flowchart that illustrates the processing sequence of pre-calculation of key elements of a conversion key.

FIG. 13 is a flowchart that illustrates an example of the processing sequence at the time of calculating key elements of the conversion key in advance. First, the conversion key generating unit 52A determines whether or not the key management server 50 is in the idle state in step S501. Then, when the key management server 50 is in the idle state (Yes in step S501), the conversion key generating unit 52A determines whether or not there is a key element, which has not been calculated, that can be calculated in advance in step S502. When there is a key element, which has not been calculated, that can be calculated in advance (Yes in step S502), the conversion key generating unit 52A calculates the key element of the conversion key, which has not been calculated, that can be calculated in advance, and the conversion key storage control unit 55 stores the key element calculated by the conversion key generating unit 52A in a corresponding storage area of the conversion key storing unit 54 in step S503. In other words, in a case where the key element calculated by the conversion key generating unit 52A is a key element of only the first conversion key, the conversion key storage control unit 55 stores the key element in the first storage area of the conversion key storing unit 54. On the other hand, in a case where the key element calculated by the conversion key generating unit 52A is a key element of only the second conversion key, the conversion key storage control unit 55 stores the key element in the second storage area of the conversion key storing unit 54. In addition, in a case where the key element calculated by the conversion key generating unit 52A is common to the first and second conversion keys, the conversion key storage control unit 55 stores the key element in both the first and second storage areas of the conversion key storing unit 54. Furthermore, in a case where the key management server 50 is not in the idle state (No in step S501) or in a case where there is no key element, which has not been calculated, that can be calculated in advance (No in step S502), the process directly ends without performing the process of step S503.

As described above, according to the power usage calculation system of this embodiment, before the conversion key generating unit 52A of the key management server 50A receives an acquisition request for the first conversion key or the second conversion key from the MDMS 20, the key elements of the first and second conversion elements are calculated in advance in a possible range, and accordingly, the responsiveness to the acquisition request for the first conversion key or the second conversion key can be improved. In addition, in a case where the key element calculated in advance by the conversion key generating unit 52A is common to the first and second conversion keys, the conversion key storage control unit 55 stores the key element in both the first storage area and the second storage area of the conversion key storing unit 54, and accordingly, the number of calculations of the key elements that is performed by the conversion key generating unit 52A is decreased, whereby the process can be efficiently performed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data management apparatus that is connected to at least one power meter collecting a power usage amount for a collection time slot in which the power usage amount is collected, an application server executing a predetermined application by using a value acquired by summing power usage amounts collected by the at least one power meter, and a key management server maintaining first secret keys maintained by the at least one power meter and a second secret key maintained by the application server, the data management apparatus comprising:
   a first receiver configured to receive a plurality of first values from the at least one power meter, each of the first values being the power usage amounts encrypted using the corresponding first secret key;
   a generator configured to generate a second value by summing the first values;
   a second receiver configured to receive a conversion key from the key management server, the conversion key being generated by using the first secret key and the second secret key;
   a converter configured to convert the second value into a third value by using the conversion key; and
   a transmitter configured to transmit the third value to the application server, wherein
   the third value is a value from which a value acquired by summing the power usage amounts is acquired by decrypting the third value using the second secret key by the application server.

2. The apparatus according to claim 1, wherein
   the first value is a value acquired by encrypting the power usage amounts by using the first secret key and time information representing one or more time slots in which the power usage amounts are collected,
   the conversion key is key information generated by using the first secret key, the second secret key, and the time information, and
   the third value is a value from which a value acquired by summing the power usage amounts is acquired by decrypting the third value using the second secret key and the time information.

3. The apparatus according to claim 2, wherein
   the first value is a value acquired by combining c and ft=0 if c is less than dt_max,
   the first value is a value acquired by combining c−dt_max and ft=1 if c is dt_max or more,
   the second value is a value acquired by combining a value acquired by summing a plurality of c's or a plurality of (c−dt_max)'s and a value acquired by summing a plurality of ft's,
   where dt is the power usage amount, dt_max is a maximum value taken by the power usage amount, K1 represents key information generated by using the first secret key and the time information, c represents dt+K1, and ft represents a flag representing whether c is dt_max or more,
   the third value is a value acquired by combining C−Kc and F, and
   a value acquired by summing the power usage amounts is acquired by C−Kc+F×dt_max,
   where C is a value acquired by summing a plurality of c's or a plurality of (c−dt_max)'s, F is a value acquired by summing a plurality of ft's, Kc represents the conversion key, and K2 represents the key information generated by using the second secret key and the time information.

4. A power usage calculation system comprising:
   at least one power meter;
   a data management apparatus;
   an application server; and
   a key management server, wherein
   the at least one power meter includes
      a collector configured to collect a power usage amount for a collection time slot in which the power usage amount is collected;
      a first generator configured to generate a first value by encrypting the power usage amount using a first secret key shared with the key management server; and
      a first transmitter configured to transmit the first value to the data management apparatus,
   the data management apparatus includes
      a first receiver configured to receive the first values from the at least one power meter;
      a second generator configured to generate a second value by summing the first values;
      a second receiver configured to receive a conversion key from the key management server;
      a convertor configured to convert the second value into a third value by using the conversion key; and
      a second transmitter configured to transmit the third value to the application server,
   the application server includes
      a third receiver configured to receive the third value from the data management apparatus;
      a third generator configured to generate a fourth value by decrypting the third value using a second secret key shared with the key management server, the fourth value being a value acquired by summing power usage amounts collected by the at least one power meter; and an executor configured to execute a predetermined application using the fourth value, and the key management server includes a fourth generator configured to generate the conversion key using the first secret key and the second secret key in response to a request from the data management apparatus; and a third transmitter configured to transmit the conversion key to the data management apparatus.

5. The system according to claim 4, wherein the conversion key is key information acquired by combining a plurality of key elements, the fourth generator is configured to calculate in advance at least one of the plurality of key elements before there is a request from the data management apparatus, and the key management server further includes a storage unit configured to store the at least one of the plurality of key elements calculated by the fourth generator.

6. The system according to claim 5, wherein a plurality of the application servers are provided, the fourth generator is configured to generate a plurality of the conversion keys corresponding to the application servers, respectively, the storage unit includes a plurality of storage areas corresponding to the application servers, respectively, and the key management server includes a storage control unit configured to store a key element into the storage areas when the at least one of the plurality of key elements calculated by the fourth generator is a key element that is common to the conversion keys.

7. A data management method, comprising:

receiving a plurality of first values from at least one power meter collecting a power usage amount for a collection time slot in which the power usage amount is collected, each of the first values being the power usage amounts encrypted using a first secret key maintained by the power meter;

generating a second value by summing the first values;

receiving a conversion key from a key management server, the conversion key being generated by using the first secret key and a second secret key maintained by an application server that executes a predetermined application by using a value acquired by summing power usage amounts collected by the at least one power meter;

converting the second value into a third value by using the conversion key; and transmitting the third value to the application server, wherein the third value is a value from which a value acquired by summing the power usage amounts is acquired by decrypting the third value using the second secret key by the application server.

8. The method according to claim 7, wherein the first value is a value acquired by encrypting the power usage amounts by using the first secret key and time information representing one or more time slots in which the power usage amounts are collected, the conversion key is key information generated by using the first secret key, the second secret key, and the time information, and the third value is a value from which a value acquired by summing the power usage amounts is acquired by decrypting the third value using the second secret key and the time information.

9. The method according to claim 8, wherein the first value is a value acquired by combining $c$ and $ft=0$ if $c$ is less than $dt_{13}$ max, the first value is a value acquired by combining $c-dt\_max$ and $ft=1$ if $c$ is $dt\_max$ or more, the second value is a value acquired by combining a value acquired by summing a plurality of $c$'s or a plurality of $(c-dt\_max)$'s and a value acquired by summing a plurality of $ft$'s, where $dt$ is the power usage amount, $dt\_max$ is a maximum value taken by the power usage amount, $K1$ represents key information generated by using the first secret key and the time information, $c$ represents $dt+K1$, and $ft$ represents a flag representing whether $c$ is $dt\_max$ or more, the third value is a value acquired by combining $C-Kc$ and $F$, and a value acquired by summing the power usage amounts is acquired by $C-Kc+F\times dt\_max$, where $C$ is a value acquired by summing a plurality of $c$'s or a plurality of $(c-dt\_max)$'s, $F$ is a value acquired by summing a plurality of $ft$'s, $Kc$ represents the conversion key, and $K2$ represents the key information generated by using the second secret key and the time information.

* * * * *